United States Patent
Zhou et al.

(10) Patent No.: US 12,526,867 B2
(45) Date of Patent: Jan. 13, 2026

(54) MANAGING BEAM FAILURE RECOVERY UPDATES

(71) Applicant: QUALCOMM Incorporated, San Diego, CA (US)

(72) Inventors: Yan Zhou, San Diego, CA (US); Fang Yuan, Beijing (CN); Linhai He, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 515 days.

(21) Appl. No.: 17/995,425

(22) PCT Filed: May 28, 2020

(86) PCT No.: PCT/CN2020/092863
§ 371 (c)(1),
(2) Date: Oct. 4, 2022

(87) PCT Pub. No.: WO2021/237558
PCT Pub. Date: Dec. 2, 2021

(65) Prior Publication Data
US 2023/0171837 A1    Jun. 1, 2023

(51) Int. Cl.
*H04W 76/19* (2018.01)
*H04B 7/06* (2006.01)
(Continued)

(52) U.S. Cl.
CPC ........ *H04W 76/19* (2018.02); *H04B 7/06964* (2023.05); *H04L 5/0051* (2013.01);
(Continued)

(58) Field of Classification Search
None
See application file for complete search history.

(56) References Cited

U.S. PATENT DOCUMENTS 11,895,695 B2   2/2024  Islam et al.
2019/0215712 A1*  7/2019  Babaei ............ H04W 72/23
(Continued)

FOREIGN PATENT DOCUMENTS

CN   110213819 A   9/2019
CN   110719154 A   1/2020
(Continued)

OTHER PUBLICATIONS

International Search Report and Written Opinion—PCT/CN2020/092863—ISA/EPO—Feb. 24, 2021. 8 pages.
(Continued)

*Primary Examiner* — Faiyazkhan Ghafoerkhan
(74) *Attorney, Agent, or Firm* — Dinsmore & Shohl LLP

(57) ABSTRACT

In various embodiments, methods that may be performed by a processor of a wireless device for managing beam failure recovery may include determining that a contention based random access (CBRA)-based beam failure recovery (BFR) procedure has been completed, determining whether a new candidate beam reference signal identifier was identified and included in a BFR media access control-control element (MAC-CE), updating beam information based on the new candidate beam reference signal identifier in response to determining that the new candidate beam reference signal identifier (RS ID) was identified and included in a BFR MAC-CE in a message to the base station, and updating the beam information based on a synchronization signal block selected during the CBRA-based BFR procedure in response to determining that the new candidate beam RS ID was not identified and included in the BFR MAC-CE in the message to the base station.

30 Claims, 21 Drawing Sheets

(51) Int. Cl.
    *H04L 5/00*     (2006.01)
    *H04W 74/0833*     (2024.01)
    *H04W 74/0836*     (2024.01)
    *H04W 74/0838*     (2024.01)

(52) U.S. Cl.
    CPC .... *H04W 74/0833* (2013.01); *H04W 74/0836* (2024.01); *H04W 74/0838* (2024.01)

(56) References Cited

U.S. PATENT DOCUMENTS

| | | | |
|---|---|---|---|
| 2019/0215820 A1* | 7/2019 | Cirik | H04W 72/0446 |
| 2019/0215870 A1* | 7/2019 | Babaei | H04W 24/10 |
| 2019/0215888 A1* | 7/2019 | Cirik | H04B 7/0695 |
| 2020/0119799 A1* | 4/2020 | Jung | H04B 7/06964 |
| 2020/0137806 A1* | 4/2020 | Islam | H04L 27/2607 |
| 2020/0322031 A1* | 10/2020 | You | H04W 76/11 |
| 2021/0091844 A1* | 3/2021 | Koskela | H04W 36/305 |
| 2021/0175955 A1* | 6/2021 | Kung | H04W 72/1263 |
| 2021/0185756 A1* | 6/2021 | Cirik | H04B 17/318 |
| 2021/0211180 A1* | 7/2021 | Jung | H04B 7/088 |
| 2021/0218458 A1* | 7/2021 | Kung | H04W 80/02 |
| 2023/0171837 A1* | 6/2023 | Zhou | H04B 7/06964 370/329 |

FOREIGN PATENT DOCUMENTS

| | | | |
|---|---|---|---|
| TW | 201939993 A | 10/2019 | |
| WO | WO-2019119399 A1 * | 6/2019 | ........... H04B 7/0408 |
| WO | 2019161119 A1 | 8/2019 | |
| WO | 2019192019 A1 | 10/2019 | |

OTHER PUBLICATIONS

Oppo: "SCell BFR MAC CE design", 3GPP TSG-RAN WG2 Meeting #108, R2-1915157, Reno, USA, Nov. 18, 2019-Nov. 22, 2019, pp. 1-5, Nov. 22, 2019 (Nov. 22, 2019) the whole document.

Moderator (Apple): "Feature Lead Summary on L1-SINR and SCell BFR", 3GPP TSG RAN WG1 #101, R1-2004709, 3rd Generation Partnership Project, Mobile Competence Centre, 650, Route Des Lucioles, F-06921 Sophia-Antipolis Cedex, France, vol. RAN WG1, No. e-Meeting, May 25, 2020-Jun. 5, 2020, May 25, 2020, p. 13, XP052346081, 15 pages.

Supplementary European Search Report—EP20938337—Search Authority—Munich—Jan. 29, 2024 10 pages.

* cited by examiner

MANAGING BEAM FAILURE RECOVERY UPDATES

BACKGROUND

Fifth Generation (5G) New Radio (NR) systems can provide high data rate communication services to wireless devices. However, the frequency bands used to provide NR services, such as millimeter wave frequencies, are susceptible to rapid channel variations and suffer from free-space pathloss and atmospheric absorption. To address these challenges, NR base stations and wireless devices may use highly directional antennas to achieve sufficient link budget in wide area networks. Such highly directional antennas require precise alignment of the transmitter and the receiver beams, for example, using beam management operations. However, beam management operations may increase the latency of establishing a communication link, and may affect control layer procedures, such as initial access, handover and beam tracking.

If a wireless device determines that channel conditions are below a threshold, the wireless device may determine that a beam failure has occurred. If the wireless device detects a threshold number of beam failures, the wireless device may initiate a beam failure recovery process with the base station.

SUMMARY

Various aspects include systems and methods for managing beam failure recovery (BFR) performed by a processor of a wireless device. Various aspects may enable a wireless device to determine and update information related to a newly selected beam in a communication link with a base station after the wireless device base performed a BFR procedure, such as a contention based random access (CBRA) procedure.

Various aspects may include determining that a contention based random access (CBRA)-based beam failure recovery (BFR) procedure has been completed, determining whether a new candidate beam reference signal identifier (RS ID) was identified and included in a BFR media access control-control element (MAC-CE) in a message from the wireless device to the base station, updating beam information based on the new candidate beam RS ID in response to determining that the new candidate beam reference signal identifier (RS ID) was identified and included in the BFR MAC-CE in the message from the wireless device to the base station, and updating the beam information based on a synchronization signal block (SSB) selected during the CBRA-based BFR procedure in response to determining that the new candidate beam RS ID was not identified and included in the BFR MAC-CE in the message from the wireless device to the base station.

In some aspects, updating the beam information may include updating one or more control resource sets (CORESETs) and a physical downlink shared channel (PDSCH) for a downlink signal. In some aspects, updating the beam information may include updating a physical uplink control channel (PUCCH), a physical uplink shared channel (PUSCH), and a sounding reference signal (SRS) for an uplink signal. In some aspects, updating the beam information may include updating a downlink path loss reference signal (DL PL RS). In some aspects, updating the beam information may include resetting one or more power control parameters to a default value.

In some aspects, updating the beam information may include updating the beam information prior to receiving a new activation command or reconfiguration message for a selected beam. In some aspects, determining that the CBRA-based BFR procedure that has been completed may include receiving a PDCCH including a cell-radio network temporary identifier (C-RNTI) from the base station, and determining that the CBRA-based BFR procedure has been completed in response to receiving the PDCCH including the C-RNTI from the base station.

In some aspects, determining that the CBRA-based BFR procedure has been completed may include receiving a PDCCH message sent on a special CORESET or in a search space that is specific for a BFR response. In some aspects, determining that the CBRA-based BFR procedure has been completed may include receiving a PDCCH message that schedules a new uplink grant with a same hybrid automatic retransmission request (HARQ) ID as used for transmitting the message from the wireless device to the base station. In some aspects, determining that the CBRA-based BFR procedure has been completed may include receiving a PDCCH message that indicates that the CBRA-based BFR has been completed successfully.

In some aspects, updating the beam information may include determining a timing for updating the beam information, and updating the beam information according to the determined timing. In some aspects, determining the timing for updating the beam information may include determining a number of symbols after receiving a latest PDCCH with C-RNTI before a MAC layer sends to a physical layer (PHY layer) an indication that the CBRA-based BFR procedure was completed successfully. In some aspects, determining the timing for updating the beam information may include updating the beam information in response to determining that the PDCCH with C-RNTI is received within a time window before the MAC layer provided an indication to the PHY layer that the CBRA-based BFR was completed successfully. In some aspects, determining that the CBRA-based BFR procedure that has been completed may include receiving a PDCCH addressed to the C-RNTI from the base station after transmission of a BFR MAC-CE, and determining that the CBRA-based BFR procedure that has been completed in response to receiving the PDCCH including the C-RNTI from the base station.

Further aspects may include a wireless device having a processor configured to perform one or more operations of any of the methods summarized above. Further aspects may include processing devices for use in a wireless device configured with processor-executable instructions to perform operations of any of the methods summarized above. Further aspects may include a non-transitory processor-readable storage medium having stored thereon processor-executable instructions configured to cause a processor of a wireless device to perform operations of any of the methods summarized above. Further aspects include a wireless device having means for performing functions of any of the methods summarized above. Further aspects include a system on chip for use in a wireless device and that includes a processor configured to perform one or more operations of any of the methods summarized above.

DETAILED DESCRIPTION

Figure 1:
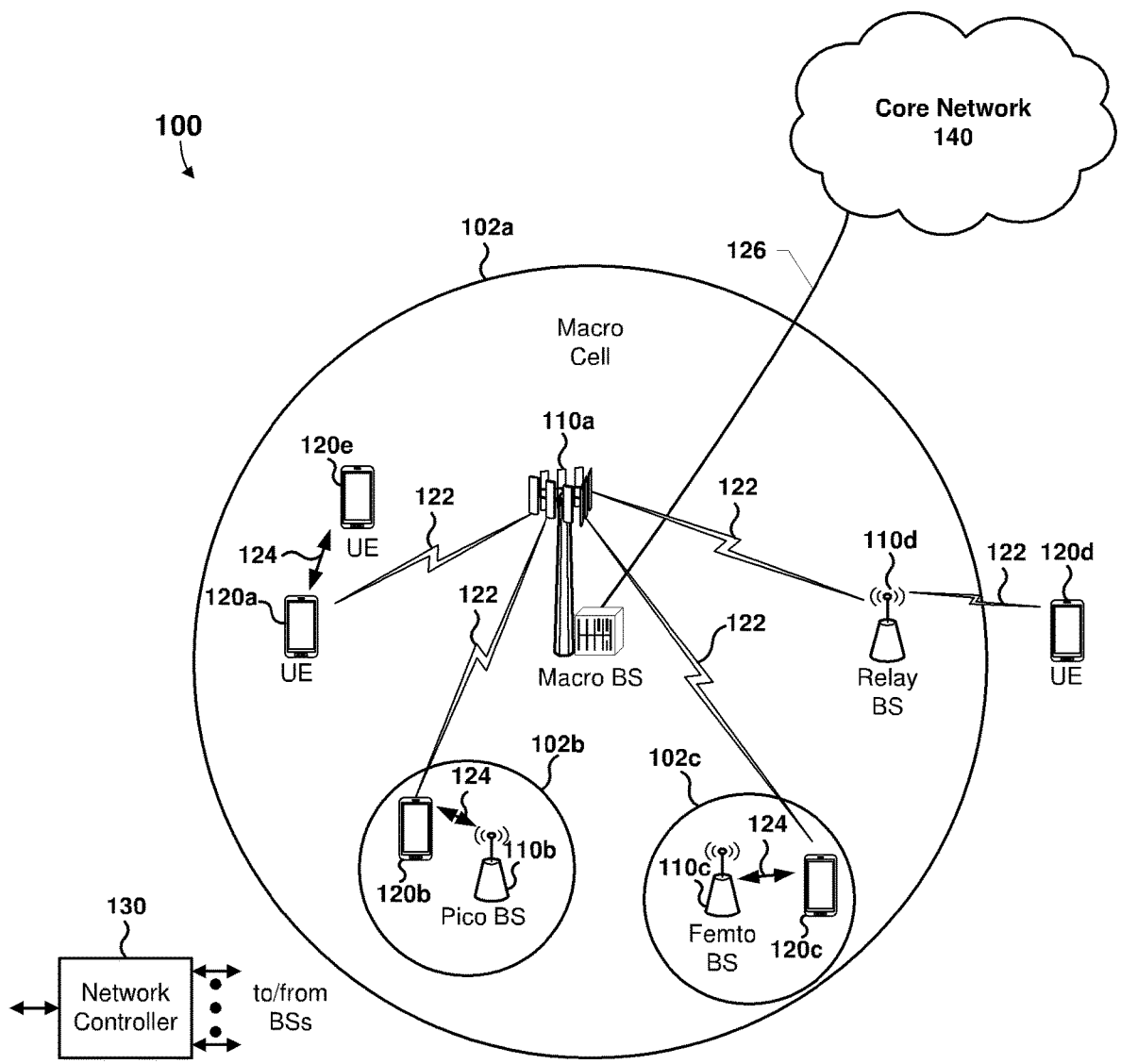
FIG. 1 is a system block diagram illustrating an example communications system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include systems and methods for managing information transmission for wireless communication between devices such as a base station and a wireless device. Various embodiments include systems and methods for managing beam failure recovery (BFR) performed by a processor of a wireless device. Various embodiments may enable a wireless device to initiate a contention based random access procedure (CBRA) in case of beam failure in a communication link with a base station. Some aspects may enable a wireless device to initiate CBRA when downlink and/or uplink resources for performing a contention free random access procedure (CFRA) are not available to the wireless device.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

NR base stations and wireless devices perform beam management operations to precisely align transmitter and the receiver beams. If a wireless device determines that channel conditions are below a threshold, the wireless device may attempt to initiate a beam failure recovery process with the base station.

For example, in NR, a wireless device and a base station (e.g., a gNodeB) may communicate via a beam (such as a Synchronization Signal Block) having a highest signal strength. In some embodiments, periodically (P), semi-persistently (AP), or aperiodically (AP), the base station may send a P/SP/AP channel state indicator-reference signal (CSI-RS) (e.g., in connected mode) to enable the wireless device to decode beams specified by a transmission configuration indicator (TCI). The wireless device may report to the base station channel conditions such as a received signal strength (for example, a Layer 1-Reference Signal Received Power (L1-RSRP). The wireless device may also report to the base station channel state feedback (CSF) of a serving beam (i.e., the beam currently used for communication between the wireless device and the base station) and one or more neighbor (or candidate) beams.

In some embodiments, if the wireless device determines that a channel condition is below a threshold (for example, L1-RSRP is below a threshold signal strength), the wireless device may initiate a timer (e.g., a T310 timer) for detecting a beam failure. The wireless device may report a detected beam failure to the network using a beam failure detection resource set, which may, in some embodiments, be configured by the network in a radio resource control (RRC) reconfiguration message. The wireless device may search for another candidate beam that may provide superior service to the wireless device. If the wireless device determines that a threshold number of beam failure detections has occurred, the wireless device may attempt to initiate BFR for the candidate beam with the network. The BFR requires the wireless device to report the beam failure to the base station on which it is camped. In some embodiments, the wireless device may initiate BFR by attempting a CFRA process to communicate with the base station. However, communication resources for performing CFRA may not be available to the wireless device in some cases.

In some embodiments, CBRA-based BFR can be triggered for a Secondary Cell (SCell) and/or a Special Cell (SpCell) when a wireless device detects a beam failure on at least one service cell, which may be the SCell or the SpCell. In some embodiments, the wireless device may determine that a beam failure has occurred if a number of physical layer (PHY layer) indicators exceeds a threshold number of indicators within a time period. Each PHY layer indicator may be sent from the PHY layer to the MAC layer to indicate that all monitored beam failure detection (BFD) reference signals (RSs) have a block error rate (BLER) greater than a threshold BLER (e.g., 10%). In some embodiments, the BLER may include a hypothetical BLER (e.g., a hypothetical physical downlink control channel (PDCCH) BLER), which may be determined from a quality of a BFD RS. The wireless device may initiate CBRA-based BFR if no resource is configured for CFRA-based BFR or PUCCH-SR-based BFR.

A CBRA-based BFR procedure may employ a four-step process or a two-step process. In four-step CBRA-based BFR, first, the wireless device may select one synchronization signal block (SSB) and select one preamble associated with the SSB for transmitting a message to the base station (e.g., Msg 1). Second, the wireless device may receive a message from the base station (e.g., Msg 2) including a PDCCH message scrambled with a Random Access-Radio Network Temporary Identifier (RA-RNTI) and a physical downlink shared channel (PDSCH) message including a Random Access Preamble ID (RAPID) and a Temporary Cell RNTI (C-RNTI). Third, the wireless device may transmit a message to the base station (e.g., Msg 3) that includes a C-RNTI Media Access Control-Control Element (MAC-CE). The Msg 3 or other message to the base station may also include a BFR MAC-CE, which may include a failed serving cell index, and may identify a new candidate beam reference signal identifier (RS ID). Fourth, the wireless device may receive from the base station a message (e.g., Msg 4) that may include a PDCCH scrambled with the C-RNTI (e.g., as carried in the Msg 3 C-RNTI MAC-CE), which may serve as a response for the CBRA-based BFR.

In two-step CBRA-based BFR, first, the wireless device may select one SSB and select a preamble associated with the SSB for preamble transmission (e.g., Msg a preamble transmission), and may transmit a message (e.g., a Msg A payload) to the base station carried, e.g., in a physical uplink shared channel (PUSCH) message, that may include the C-RNTI MAC-CE. The messages also may include the BFR MAC-CE, which may include a failed serving cell index, and also may include an identified new candidate beam RS ID. Second, the wireless device may receive from the base station a message (e.g., Msg B) that may include a PDCCH message scrambled with the C-RNTI as conveyed in the C-RNTI MAC-CE (e.g., in the Msg A payload), which may serve as a response for the CBRA-based BFR.

Various embodiments enable a wireless device to update information, such as beam information, path loss reference signal information, and other information required for communication with the base station, following the performance of CBRA-based BFR. For conciseness, the term "beam information" is used herein to refer to beam information, path loss reference signal information, and/or other information required for communication with the base station.

In some embodiments, a wireless device may determine that a contention based random access CBRA-based BFR procedure has been successfully completed. In some embodiments the completed CBRA-based BFR procedure may have selected a beam for communication with a base station. The wireless device may determine whether a new candidate beam reference signal identifier (RS ID) was identified and included in a BFR media access control-control element (MAC-CE) in a message from the wireless device to the base station. In response to determining that the new candidate beam reference signal identifier (RS ID) was identified and included in the BFR MAC-CE in the message from the wireless device to the base station, the wireless device may update beam information based on the new candidate beam RS ID. In response to determining that the new candidate beam RS ID was not identified and included in the BFR MAC-CE in the message from the wireless device to the base station, the wireless device may update the beam information based on a synchronization signal block (SSB) selected during the CBRA-based BFR procedure.

In some embodiments, the wireless device may update one or more control resource sets (CORESETs) and a physical downlink shared channel (PDSCH) for a downlink signal. In some embodiments, the wireless device may update a physical uplink control channel (PUCCH), a physical uplink shared channel (PUSCH), and a sounding reference signal (SRS) for an uplink signal. In some embodiments, the wireless device may update a downlink path loss reference signal (DL PL RS). In some embodiments, the wireless device may reset one or more power control parameters to a default value. In some embodiments, the wireless device may update the beam information prior to receiving a new activation command or reconfiguration message for a selected beam. In some embodiments, determining the completion of a contention based random access (CBRA) beam failure recovery (BFR) procedure that selected a beam for communication with a base station may include determining the completion of a contention based random access in response to receiving a PDCCH including a cell-radio network temporary identifier (C-RNTI) from the base station.

In some embodiments, for CBRA-based BFR, the wireless device may transmit in a PUSCH in Msg 3 or Msg A at least one MAC CE providing one index for at least one corresponding serving cell with radio link quality worse than $Q_{out,LR}$, an index q_new for a periodic CSI-RS configuration or for a SS/PBCH block provided by higher layers (as may be described in relevant 3GPP technical standards), if any, for a corresponding serving cell. After successful completion of CBRA-based BFR, after 28 symbols from a last symbol of the Msg4/B PDCCH reception where the user equipment (UE) detects a DCI format with CRC scrambled by C-RNTI, the wireless device may monitor PDCCH in all CORESETs on the serving cell(s) indicated by the MAC CE using the same antenna port quasi co-location parameters as the ones associated with the corresponding index(es) q_new, if any. The wireless device may transmit PUCCH on a PUCCH-Cell using a same spatial domain filter as the one corresponding to q_new for periodic CSI-RS or SS/PBCH block reception (as may be described in relevant 3GPP technical standards), and using a transmit power determined with q_u=0, q_d=q_new, and l=0, if the wireless device is provided PUCCH-SpatialRelationInfo for the PUCCH and/or the PUCCH-Cell is included in the serving cell(s) indicated by the MAC-CE. The wireless device may transmit SRS resource with higher layer parameter usage in SRS-ResourceSet set to 'codebook' and 'nonCodebook' using a same spatial domain filter as the one corresponding to q_new for periodic CSI-RS or SS/PBCH block reception, and using a transmit power determined as with q_d=q_new, and l=0 (as may be described in relevant 3GPP technical standards), if the wireless device is provided spatialRelationInfo for the SRS resource. The SCS configuration for the 28 symbols is the smallest of the SCS configurations of the active DL BWP for the PDCCH reception and of the active DL BWP(s) of the at least one serving cell.

Various embodiments enable a wireless device to update beam information and/or path loss information, for example, after the completion of a CBRA-based BFR procedure. Various embodiments improve the operations of a wireless device and a communication network by enabling the wireless device to update information required to maintain communications following completion of a CBRA-based BFR procedure. Thus, various embodiments improve the operations of a wireless device and a communication network by improving the quality and efficiency of communication operations of the wireless device and the communication network.

FIG. 1 shows a system block diagram illustrating an example communications system. The communications system 100 may be a 5G New Radio (NR) network, or any other suitable network such as a Long Term Evolution (LTE) network.

The communications system 100 may include a heterogeneous network architecture that includes a core network 140 and a variety of wireless devices (illustrated as wireless devices 120a-120e in FIG. 1). The communications system 100 also may include a number of base stations (illustrated as the BS 110a, the BS 110b, the BS 110c, and the BS 110d) and other network entities. A base station is an entity that communicates with wireless devices, and also may be referred to as a Computing platformB, a Computing platform B, an LTE evolved computing platformB (eNB), an access point (AP), a radio head, a transmit receive point (TRP), a New Radio base station (NR BS), a 5G Computing platformB (NB), a Next Generation Computing platformB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by wireless devices with service subscription. A pico cell may cover a relatively small geographic area and may allow unrestricted access by wireless devices with service subscription. A femto cell may cover a relatively small geographic area (for example, a home) and may allow restricted access by wireless devices having association with the femto cell (for example, wireless devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "computing platform B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network computing platforms (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (such as relay BS 110d). A relay station is an entity that can receive a transmission of data from an upstream station (for example, a base station or a wireless device) and send a transmission of the data to a downstream station (for example, a wireless device or a base station). A relay station also may be a wireless device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, etc.

A macro base station 110a may communicate with the communication network 140 over a wired or wireless communication link 126. The wireless devices 120a, 120b, 120c may communicate with a base station 110a-110d over a wireless communication link 122.

The wireless communication links 122 and 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (such as LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, some implementations may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per wireless device. Multi-layer transmissions with up to 2 streams per wireless device may be supported.

Aggregation of multiple cells may be supported with up to eight serving cells. Alternatively, NR may support a different air interface, other than an OFDM-based air interface.

Some wireless devices may be considered machine-type communication (MTC) or evolved or enhanced machine-type communication (eMTC) wireless devices. MTC and eMTC wireless devices include, for example, robots, drones, remote devices, sensors, meters, monitors, location tags, etc., that may communicate with a base station, another device (for example, remote device), or some other entity. A wireless computing platform may provide, for example, connectivity for or to a network (for example, a wide area network such as Internet or a cellular network) via a wired or wireless communication link. Some wireless devices may be considered Internet-of-Things (IoT) devices or may be implemented as NB-IoT (narrowband internet of things) devices. The wireless device 120a-120e may be included inside a housing that houses components of the wireless device 120a-120e, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

In some implementations, two or more wireless devices (for example, illustrated as the wireless device 120a and the wireless device 120e) may communicate directly using one or more sidelink channels (for example, without using a base station 110a-d as an intermediary to communicate with one another). For example, the wireless devices 120a-e may communicate using peer-to-peer (P2P) communications, device-to-device (D2D) communications, a vehicle-to-everything (V2X) protocol (which may include a vehicle-tovehicle (V2V) protocol, a vehicle-to-infrastructure (V2I) protocol, or similar protocol), a mesh network, or similar networks, or combinations thereof. In this case, the wireless device 120a-120e may perform scheduling operations, resource selection operations, as well as other operations described elsewhere herein as being performed by the base station 110a-110d.

Figure 2:
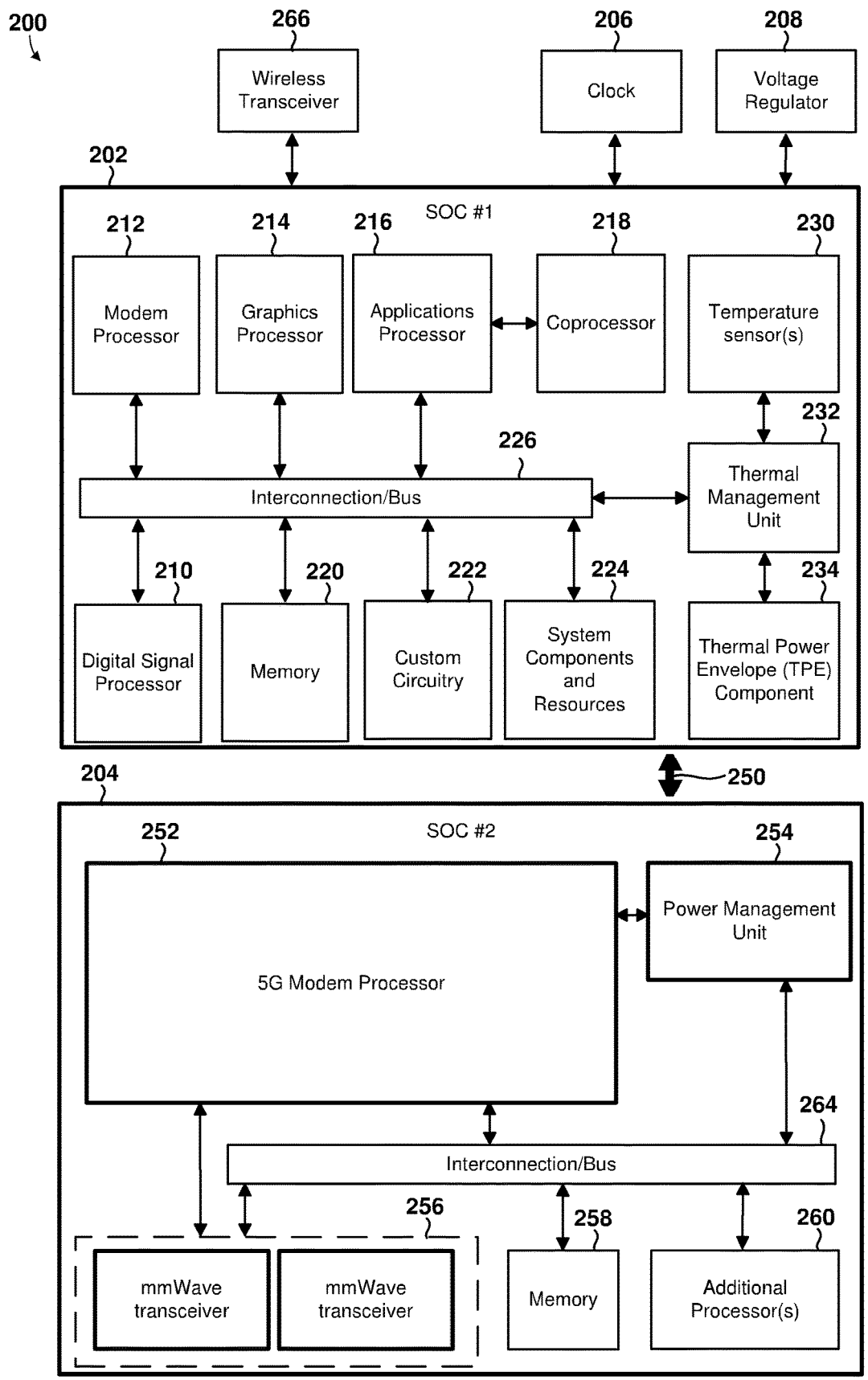
FIG. 2 is a component block diagram illustrating an example computing system suitable for implementing any of the various embodiments.

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example computing system 200 (which may be a SIP in some embodiments) includes a two SOCs 202, 204 coupled to a clock 206, a voltage regulator 208, and a wireless transceiver 266 configured to send and receive wireless communications via an antenna (not shown) to/from wireless devices, such as a base station 110a. In some implementations, the first SOC 202 may operate as central processing unit (CPU) of the wireless device that carries out the instructions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (such as 5 Gbps, etc.), or very high frequency short wave length (such as 28 GHz mmWave spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 or custom circuitry 222 also may include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates or implement a bus architecture (such as CoreConnect, AMBA, etc.). Communications may be provided by advanced interconnects, such as high-performance networks-on chip (NoCs).

The first or second SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the example SIP 200 discussed above, some implementations may be implemented in a wide variety of computing systems, which may include a single processor, multiple processors, multicore processors, or any combination thereof.

Figure 3:
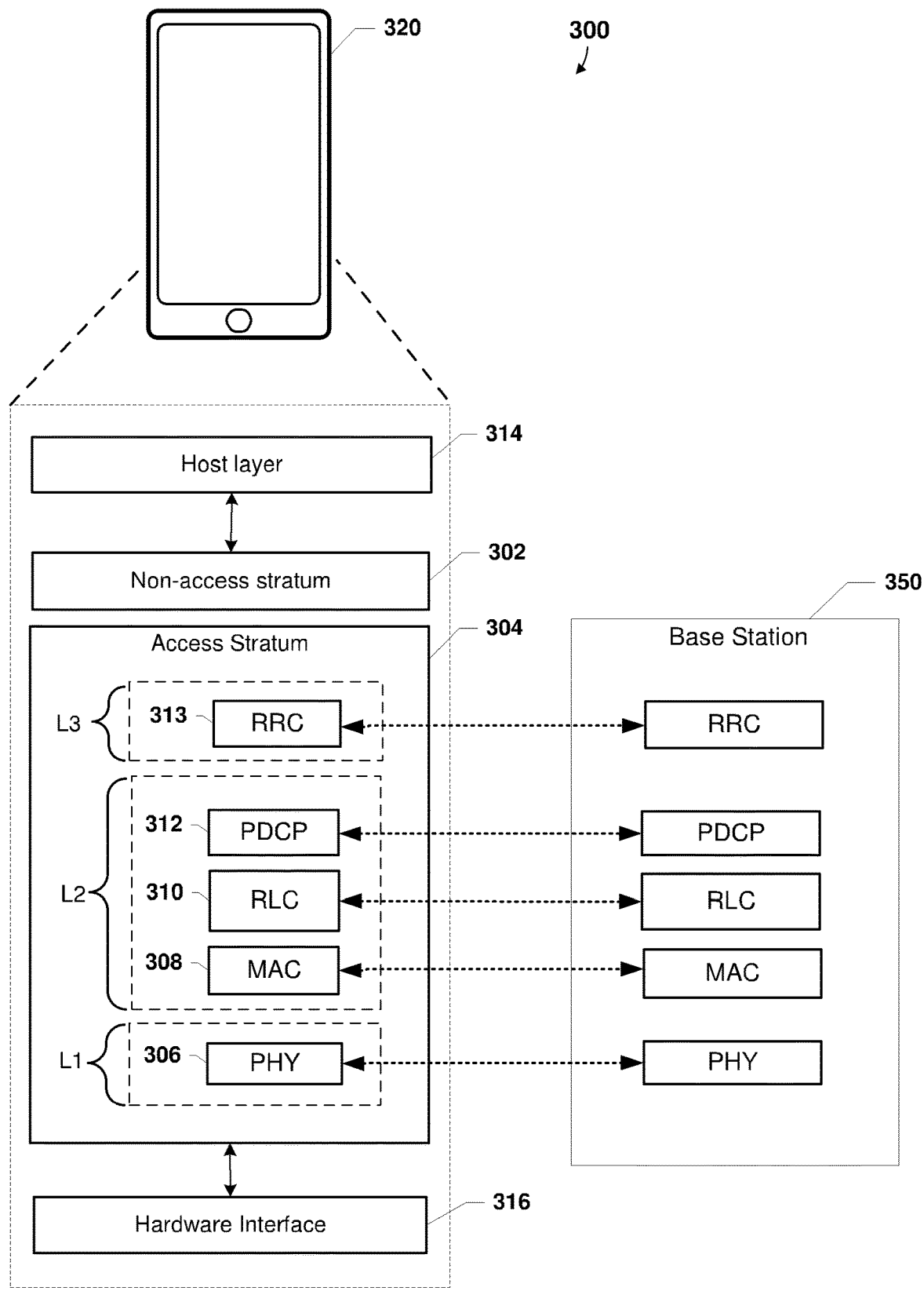
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1-3, the wireless device 320 may implement the software architecture 300 to facilitate communication between a wireless device 320 (e.g., the wireless device 120a-120e, 200) and the base station 350 (e.g., the base station 110a) of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (such as SIM(s) 204) and its core network 140. The AS 304 may include functions and protocols that support communication between a SIM(s) (such as SIM(s) 204) and entities of supported access networks (such as a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission or reception over the air interface via a wireless transceiver (e.g., 266). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In some implementations, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In some implementations, the RRC sublayer 313 may provide functions INCLUDING broadcasting system information, paging, and establishing and releasing an RRC signaling connection between the wireless device 320 and the base station 350.

In some implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some implementations, application-specific functions provided by the at least one host layer 314 may provide an interface between the software architecture and the general purpose processor 206.

In other implementations, the software architecture 300 may include one or more higher logical layer (such as transport, session, presentation, application, etc.) that provide host layer functions. For example, in some implementations, the software architecture 300 may include a network layer (such as Internet protocol (IP) layer) in which a logical connection terminates at a packet data network (PDN) gateway (PGW). In some implementations, the software architecture 300 may include an application layer in which a logical connection terminates at another device (such as end user device, server, etc.). In some implementations, the software architecture 300 may further include in the AS 304 a hardware interface 316 between the physical layer 306 and the communication hardware (such as one or more radio frequency (RF) transceivers).

Figure 4:
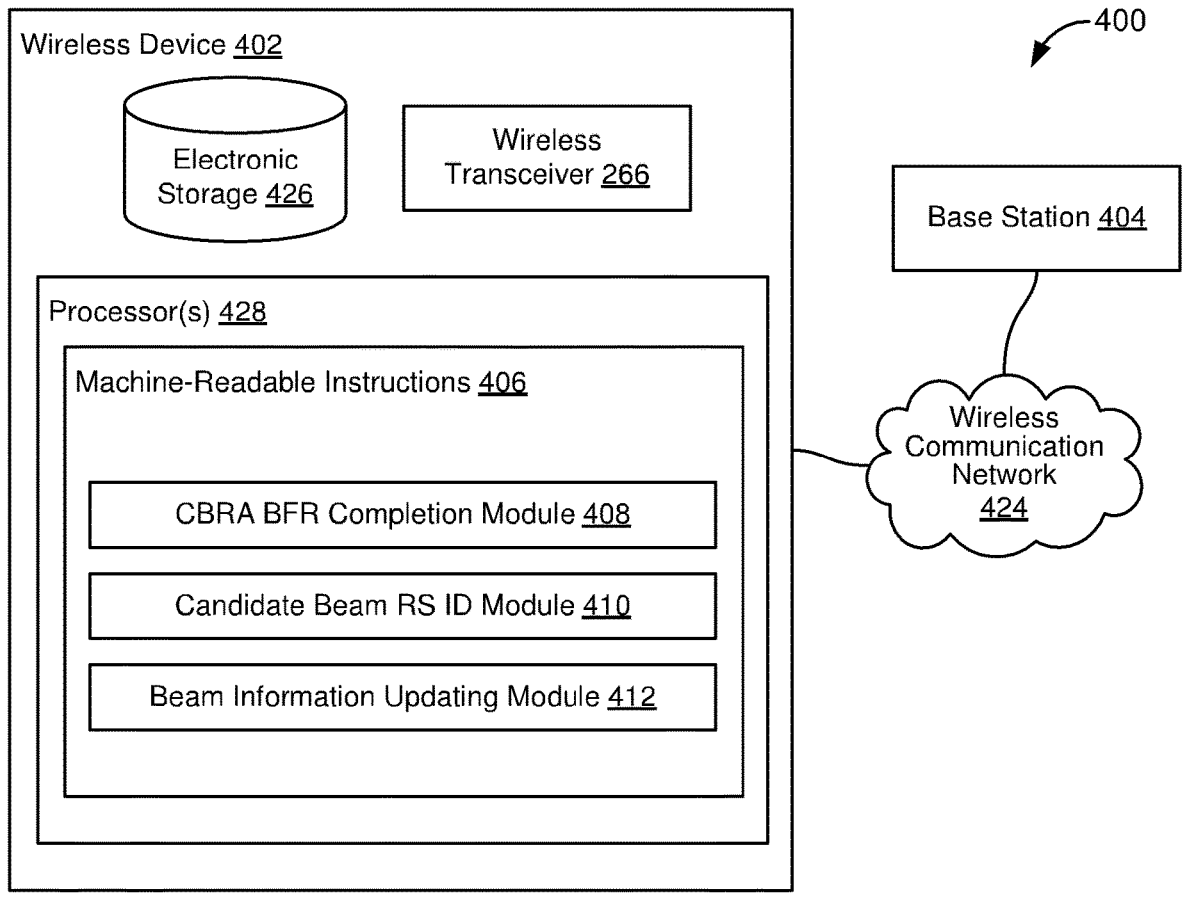
FIG. 4 is a component block diagram illustrating a system configured for managing beam failure recovery in accordance with various embodiments.

FIG. 4 is a component block diagram illustrating a system 400 configured for managing beam failure recovery in accordance with various embodiments. With reference to FIGS. 1-4, the system 400 may include a wireless device 402 (e.g., 120a-120e, 200, 320) and a base station 404 (e.g., 110-110d, 200, 350). The wireless device 402 and the base station 404 may communicate over a wireless communication network 424 (aspects of which are illustrated in FIG. 1).

The wireless device 402 may include one or more processors 428 coupled to electronic storage 426 and a wireless transceiver (e.g., 266). The wireless transceiver 266 may be configured to receive messages to be sent in uplink transmissions from the processor(s) 428, and to transmit such messages via an antenna (not shown) to a wireless communication network 424 for relay to the base station 404. Similarly, the wireless transceiver 266 may be configured to receive messages from base station 404 in downlink transmissions from the wireless communication network 424 and pass the messages (e.g., via a modem (e.g., 252) that demodulates the messages) to the one or more processors 428.

The processor(s) 428 may be configured by machine-readable instructions 406. Machine-readable instructions 406 may include one or more instruction modules. The instruction modules may include computer program modules. The instruction modules may include one or more of a CBRA BFR completion module 408, a candidate beam RS ID module 410, a beam information updating module 412, or other instruction modules.

The CBRA BFR completion module 408 may be configured to determine that a CBRA-based BFR procedure has been completed.

The candidate beam RS ID module 410 may be configured to determine whether a new candidate beam reference signal identifier (RS ID) was identified and included in a BFR media access control-control element (MAC-CE) in a message from the wireless device to the base station.

The beam information updating module 412 may be configured to update beam information based on the new candidate beam RS ID in response to determining that the new candidate beam reference signal identifier (RS ID) was identified and included in the BFR MAC-CE in the message from the wireless device to the base station. The beam information updating module 412 may be configured to update the beam information based on a synchronization signal block (SSB) selected during the CBRA BFR procedure in response to determining that the new candidate beam RS ID was not identified and included in the BFR MAC-CE in the message from the wireless device to the base station.

The electronic storage 426 may include non-transitory storage media that electronically stores information. The storage media of the electronic storage 426 may include one or both of system storage that is provided integrally (i.e., substantially non-removable) with wireless device 402 and/ or removable storage that is removably connectable to wireless device 402 via, for example, a port (e.g., a universal serial bus (USB) port, a firewire port, etc.) or a drive (e.g., a disk drive, etc.). The electronic storage 426 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426 may include one or more virtual storage resources (e.g., cloud storage, a virtual private network, and/or other virtual storage resources). The electronic storage 426 may store software algorithms, information determined by processor(s) 420 information received from the wireless device 402, or other information that enables the wireless device 402 to function as described herein.

Processor(s) 428 may be configured to provide information processing capabilities in the wireless device 402. As such, processor(s) 428 may include one or more of a digital processor, an analog processor, a digital circuit designed to process information, an analog circuit designed to process information, a state machine, and/or other mechanisms for electronically processing information. Although processor(s) 428 are illustrated as single entities, this is for illustrative purposes only. In some implementations, processor(s) 428 may include a plurality of processing units and/or processor cores. The processing units may be physically located within the same device, or processor(s) 428 may represent processing functionality of a plurality of devices operating in coordination. Processor(s) 428 may be configured to execute modules 408-412 and/or other modules. Processor(s) 428 may be configured to execute modules 408-412 and/or other modules by software; hardware; firmware; some combination of software, hardware, and/or firmware; and/or other mechanisms for configuring processing capabilities on the processor(s) 428. As used herein, the term "module" may refer to any component or set of components that perform the functionality attributed to the module. This may include one or more physical processors during execution of processor readable instructions, the processor readable instructions, circuitry, hardware, storage media, or any other components.

Figure 5:
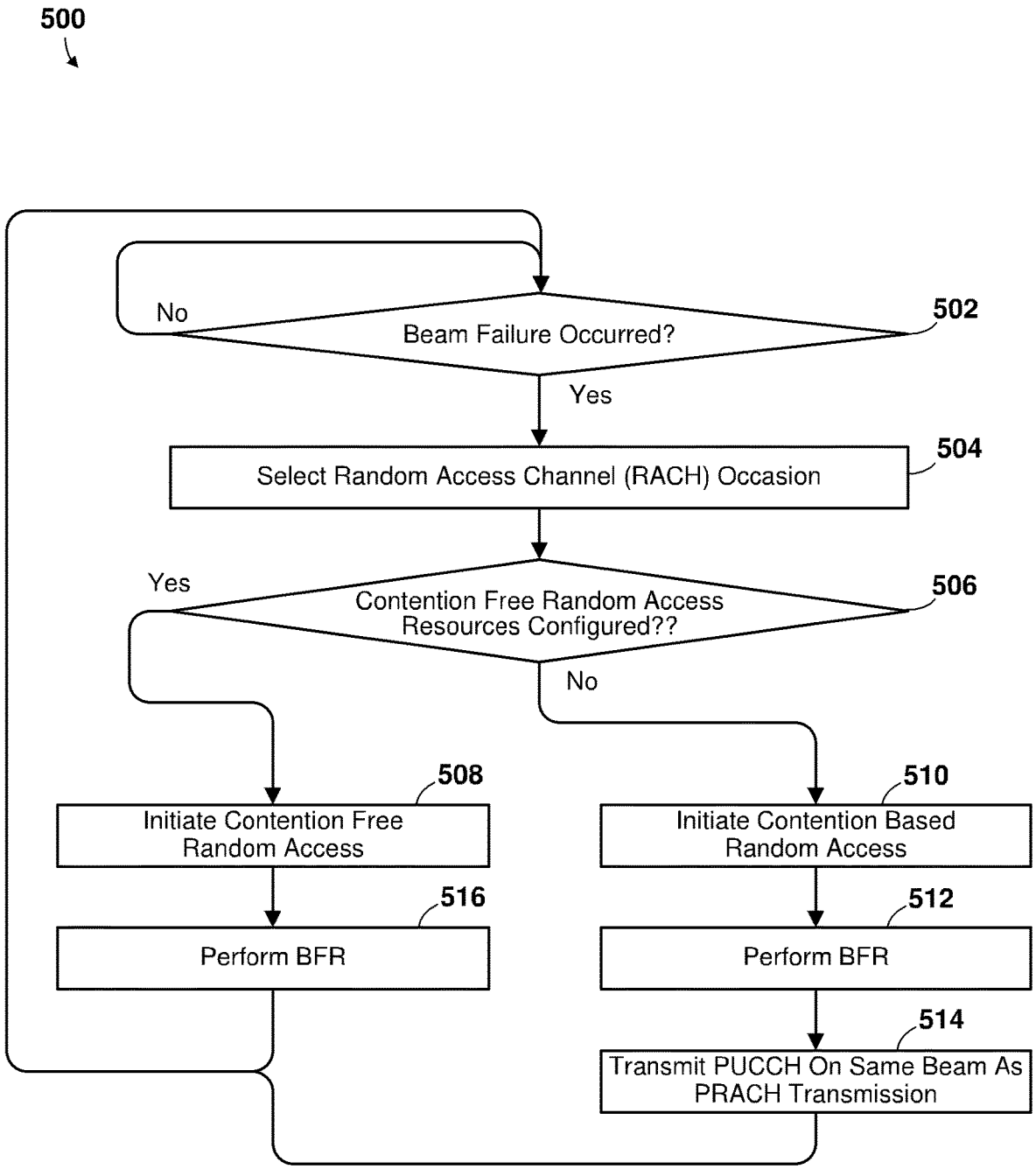
FIG. 5 is a process flow diagram illustrating a method that may be performed by a processor of a wireless device for managing beam failure recovery in accordance with various embodiments.

The description of the functionality provided by the different modules 408-412 described below is for illustrative purposes, and is not intended to be limiting, as any of modules 408-412 may provide more or less functionality than is described. For example, one or more of the modules 408-412 may be eliminated, and some or all of its functionality may be provided by other modules 408-412. As another example, the processor(s) 428 may be configured to execute one or more additional modules that may perform some or all of the functionality attributed below to one of the modules 408-412. FIG. 5 is a process flow diagram illustrating a method 500 that may be performed by a processor of a wireless device for managing beam failure recovery in accordance with various embodiments. With reference to FIGS. 1-5, the operations of the method 500 may be performed by a processor (such as the processor 210, 212, 214, 216, 218, 252, 260, 428) of a wireless device (such as the wireless device 120a-120e, 200, 320, 402).

In determination block 502, the processor may determine whether a beam failure of a communication link with a base station has occurred. Means for performing the operations of determination block 502 may include the processor (e.g., 210, 212, 214, 216, 218, 252, 260, 428) coupled to a wireless transceiver (e.g., 266).

In response to determining that the beam failure has not occurred (i.e., determination block 502="No"), the processor may repeat the operations of determination block 502.

In response to determining that the beam failure has occurred (i.e., determination block 502="Yes"), the processor may identify a random access channel (RACH) occasion in response to determining that the beam failure has occurred in block 504. For example, the processor may determine that a channel condition (such as an RSRP) is below a threshold (such as a signal strength threshold). Means for performing the operations of determination block 504 may include the processor (e.g., 210, 212, 214, 216, 218, 252, 260, 428) coupled to a wireless transceiver (e.g., 266).

In determination block 506, the processor may determine whether contention free random access (CFRA) resources have been configured. In some embodiments, the processor may determine whether a downlink beam has been mapped to the selected RACH occasion. In some embodiments, the processor may determine whether a quasi-colocation (QCL) assumption has been mapped to the selected RACH occasion. For example, two antenna ports may be said to be quasi-collocated if properties of the channel over which a symbol on one antenna port is conveyed can be inferred from the channel over which a symbol on the other antenna port is conveyed. In some embodiments, a QCL assumption may be transmitted by a base station to a wireless device via a downlink control information (DCI). In some embodiments, the processor may determine whether a downlink reference signal (DL RS) mapped to the selected RACH occasion (or Physical RACH (PRACH) occasion) is different from any active downlink beam or QCL assumption. Means for performing the operations of determination block 506 may include the processor (e.g., 210, 212, 214, 216, 218, 252, 260, 428) coupled to a wireless transceiver (e.g., 266).

In response to determining that CFRA resources have been configured (i.e., determination block 506="Yes"), the processor may initiate CFRA in block 508. Means for performing the operations of determination block 508 may include the processor (e.g., 210, 212, 214, 216, 218, 252, 260, 428) coupled to a wireless transceiver (e.g., 266).

In block 516, the processor may perform one or more beam failure recovery operations. Means for performing the operations of determination block 510 may include the processor (e.g., 210, 212, 214, 216, 218, 252, 260, 428) coupled to a wireless transceiver (e.g., 266).

In response to determining that CFRA resources have not been configured (i.e., determination block 506="No"), the processor may initiate CBRA in block 510. In some embodiments, initiating CBRA may include performing one or more operations to begin a CBRA procedure. In some embodiments, initiating CBRA may include sending to the base station a PRACH transmission, such as random access preamble or another suitable message. Means for performing the operations of determination block 510 may include the processor (e.g., 210, 212, 214, 216, 218, 252, 260, 428) coupled to a wireless transceiver (e.g., 266).

In block 512, the processor may perform one or more beam failure recovery operations. Means for performing the operations of determination block 510 may include the processor (e.g., 210, 212, 214, 216, 218, 252, 260, 428) coupled to a wireless transceiver (e.g., 266).

In block 514, the processor may transmit a PUCCH on a same cell as a PRACH transmission. In some embodiments, the processor may determine based on one or more PRACH characteristics and on one or more other conditions to reset the PUCCH beam to a PRACH beam. In some embodiments, the processor may transmit the PUCCH on the same cell as a PRACH transmission after a successful completion of CBRA beam failure recovery. In some embodiments, the processor may transmit the PUCCH to a Primary Cell (PCell) or a Primary Secondary Cell (PSCell). In some embodiments, for the PCell or the PSCell, after successful completion of contention based random access procedure for beam failure recovery, after 28 symbols from a last symbol of a first PDCCH reception where the wireless device detects a DCI format with CRC scrambled by C-RNTI and until the wireless device receives an activation command for PUCCH-SpatialRelationInfo or is provided PUCCH-SpatialRelationInfo for one or more PUCCH resources, the wireless device may transmit a PUCCH on a same cell as the PRACH transmission using one or more of a same spatial filter as for the last PRACH transmission and a determined power. In some embodiments, the power may be determined based on one or more parameters, including, for example, q_u=0, q_d=q_newcBRA, l=0, where q_newCBRA is the SS/PBCH block index provided by higher layers.

Following the operations of blocks 514 or 516, the processor may again perform the operations of determination block 502 as described.

FIGS. 6-10 are process flow diagrams illustrating operations 600-1000 that may be performed by a processor of a wireless device as part of the method 500 for managing beam failure recovery in accordance with various embodiments. With reference to FIGS. 1-10, the operations 600-1000 may be performed by a processor of a wireless device (such as the wireless device 120a-120e, 200, 320, 402).

Figure 6:
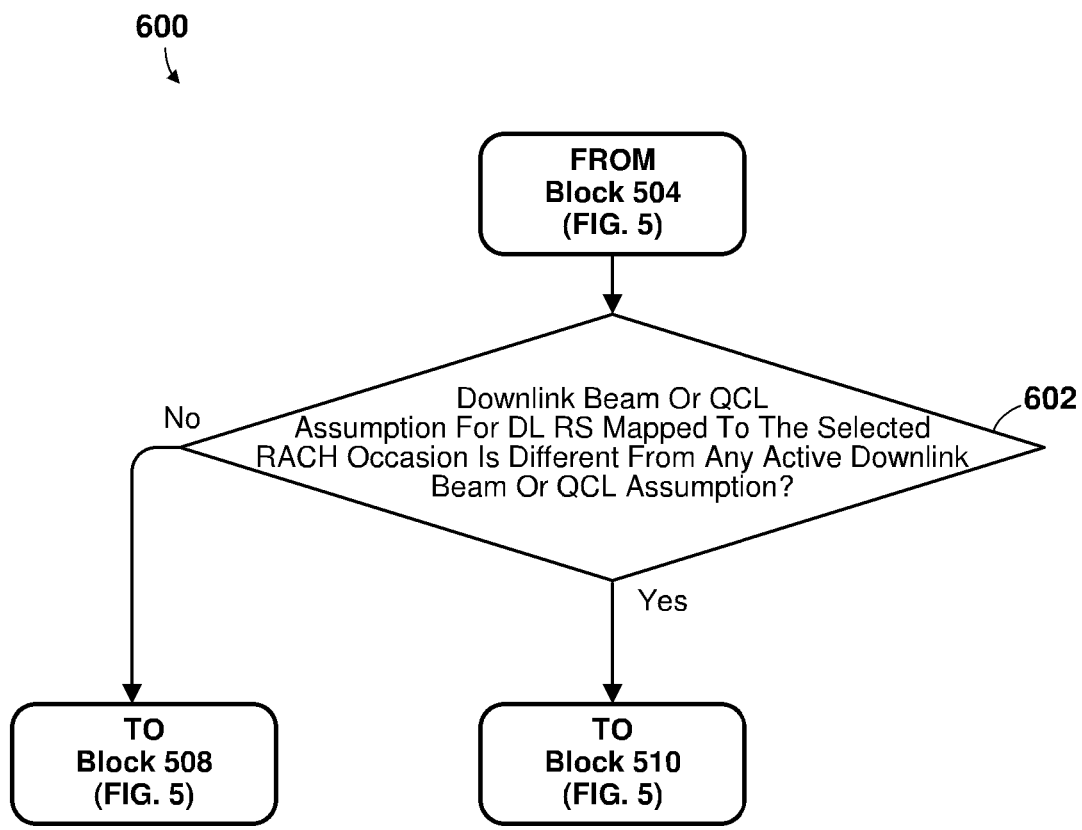
FIGS. 6-10 are process flow diagrams illustrating operations that may be performed by a processor of a wireless device as part of a method for managing beam failure recovery in accordance with various embodiments.

Referring to FIG. 6, after performing the operations of block 504 (FIG. 5), the processor may determine whether a downlink beam or quasi-colocation (QCL) assumption for a downlink reference signal (DL RS) that is mapped to the selected RACH occasion is different from any active downlink beam or quasi-colocation (QCL) assumption in determination block 602. Means for performing the operations of determination block 602 may include the processor (e.g., 210, 212, 214, 216, 218, 252, 260, 428) coupled to a wireless transceiver (e.g., 266).

In response to determining that a downlink beam or QCL assumption for a DL RS that is mapped to the selected RACH occasion is not different from any active downlink beam or quasi-colocation (QCL) assumption (i.e., determination block 602="No"), the processor may perform the operations of block 508 (i.e., initiate CFRA) as described with reference to FIG. 5.

In response to determining that a downlink beam or QCL assumption for a DL RS that is mapped to the selected RACH occasion is different from any active downlink beam or quasi-colocation (QCL) assumption (i.e., determination block 602="Yes"), the processor may perform the operations of block 510 (i.e., initiate CBRA) as described with reference to FIG. 5. In some embodiments, such determination by the processor may imply that all active downlink transmit and receive (Tx/Rx) beam pairs have failed (e.g., that a block error rate (BLER) of all active downlink Tx/Rx beam pairs exceeds a BLER threshold).

Figure 7:
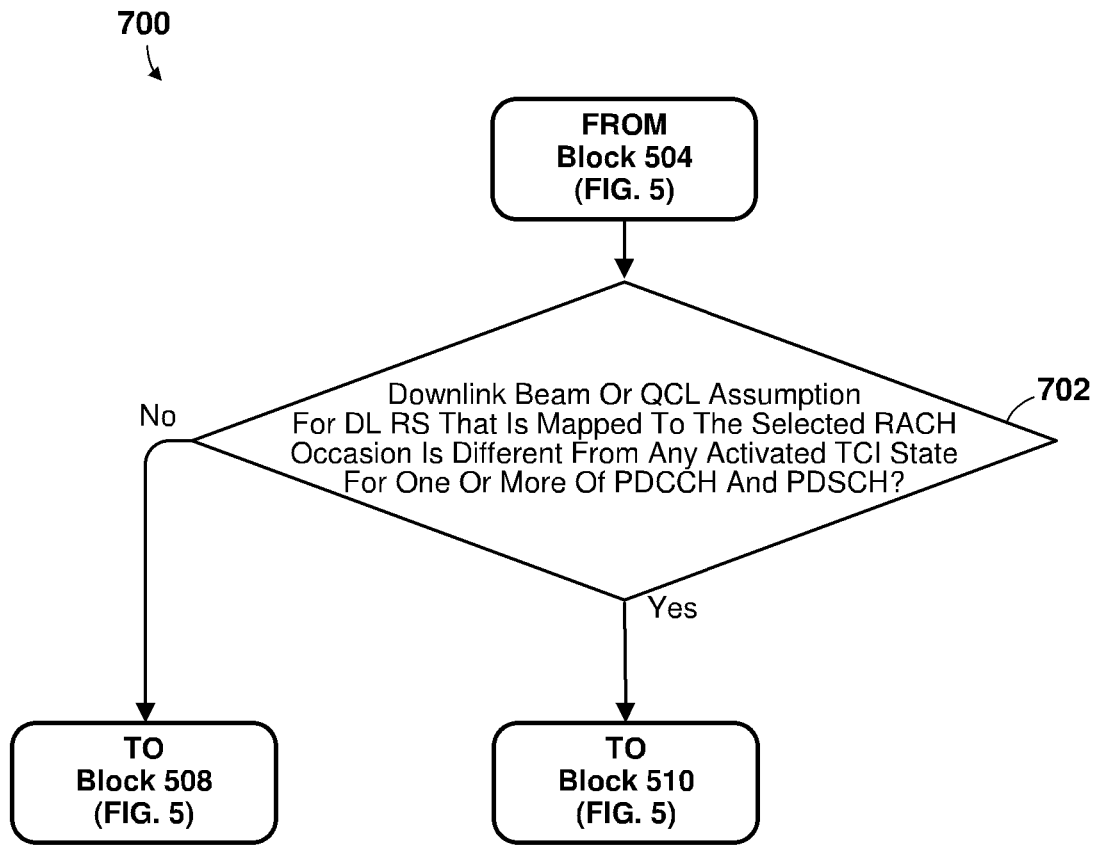

Referring to FIG. 7, after performing the operations of block 504 (FIG. 5), the processor may determine whether the downlink beam or QCL assumption for a DL RS that is mapped to the selected RACH occasion is different from any activated transmission configuration indicator (TCI) state for one or more of a physical downlink control channel (PDCCH) and a physical downlink shared channel (PDSCH) in determination block 702. In some embodiments, one or more TCI states may be sent from the base station to the wireless device via a DCI message that may include configurations such as QCL relationships between downlink reference signal(s) (DL RS) in a channel state indicator reference signal (CSI-RS) set and one or more PDSCH demodulation reference signal (DMRS) ports. In some embodiments, a TCI state may include parameters for configuring a quasi-colocation relationship between one or two downlink reference signals and the DMRS ports of the PDSCH, the DMRS port of the PDCCH or the CSI-RS port(s) of a CSI-RS resource. Means for performing the operations of determination block 702 may include the processor (e.g., 210, 212, 214, 216, 218, 252, 260, 428) coupled to a wireless transceiver (e.g., 266).

In response to determining that the downlink beam or QCL assumption for a DL RS that is mapped to the selected RACH occasion is not different from any activated TCI state for one or more of the PDCCH and the PDSCH (i.e., determination block 702="No"), the processor may perform the operations of block 508 (i.e., initiate CFRA) as described with reference to FIG. 5.

In response to determining that the downlink beam or QCL assumption for a DL RS that is mapped to the selected RACH occasion is different from any activated TCI state for one or more of the PDCCH and the PDSCH (i.e., determination block 702="Yes"), the processor may perform the operations of block 510 (i.e., initiate CBRA) as described with reference to FIG. 5.

Figure 8:
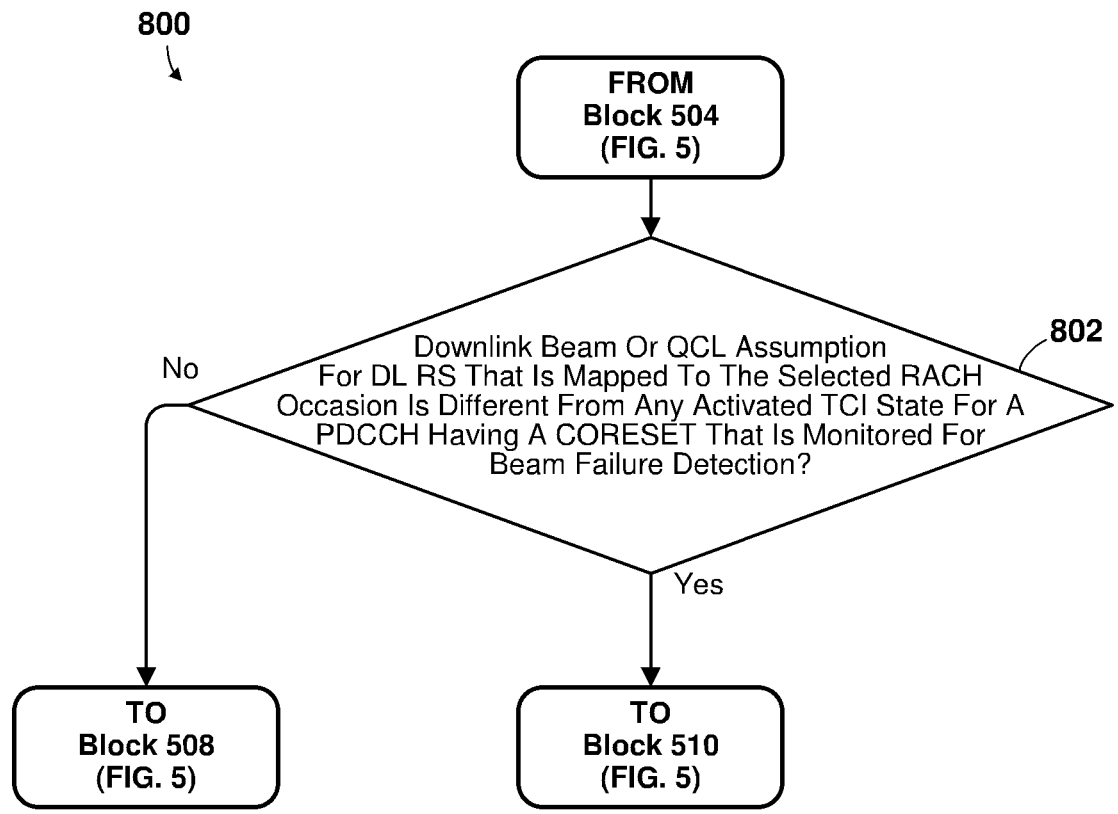

Referring to FIG. 8, after performing the operations of block 504 (FIG. 5), the processor may determine whether a downlink beam or QCL assumption for a DL RS that is mapped to the selected RACH occasion is different from any activated TCI state for a PDCCH having a control resource set (CORESET) that is monitored for beam failure detection in determination block 802. Means for performing the operations of determination block 802 may include the processor (e.g., 210, 212, 214, 216, 218, 252, 260, 428) coupled to a wireless transceiver (e.g., 266).

In response to determining that the downlink beam or QCL assumption for a DL RS that is mapped to the selected RACH occasion is not different from any activated TCI state for a PDCCH having a control resource set (CORESET) that is monitored for beam failure detection (i.e., determination block 802="No"), the processor may perform the operations of block 508 (i.e., initiate CFRA) as described with reference to FIG. 5.

In response to determining that the downlink beam or QCL assumption for a DL RS that is mapped to the selected RACH occasion is different from any activated TCI state for a PDCCH having a control resource set (i.e., determination block 802="Yes"), the processor may perform the operations of block 510 (i.e., initiate CBRA) as described with reference to FIG. 5.

Figure 9:
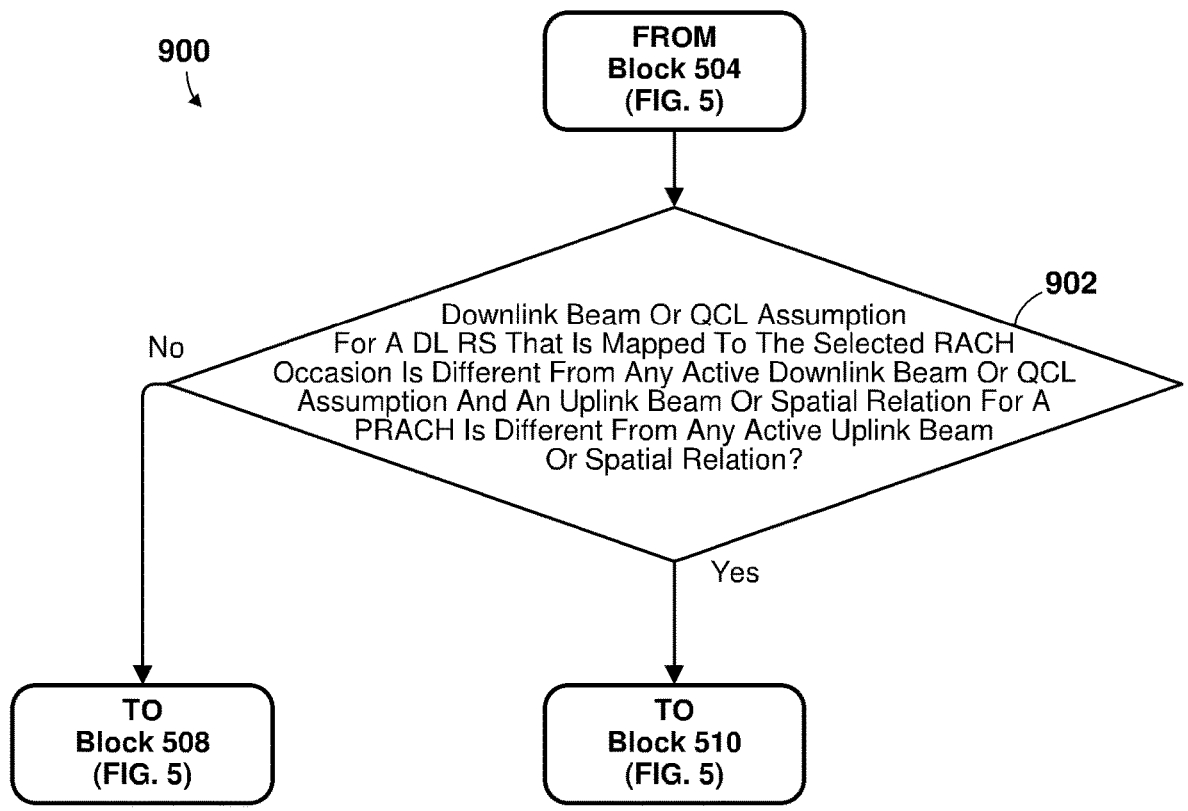

Referring to FIG. 9, after performing the operations of block 504 (FIG. 5), the processor may determine whether a downlink beam or QCL assumption for a DL RS that is mapped to the selected RACH occasion is different from any active downlink beam or QCL assumption and an uplink beam or spatial relation for a PRACH is different from any active uplink beam or spatial relation in determination block 902. In some embodiments, one or more PUCCH resource sets may be configured with a set of candidate spatial relation signals by, for example, a radio resource control (RRC) message from a base station. Means for performing the operations of determination block 902 may include the processor (e.g., 210, 212, 214, 216, 218, 252, 260, 428) coupled to a wireless transceiver (e.g., 266).

In response to determining that the downlink beam or QCL assumption for a DL RS that is mapped to the selected RACH occasion is not different from any active downlink beam or QCL assumption and an uplink beam or spatial relation for a PRACH is different from any active uplink beam or spatial relation (i.e., determination block 902="No"), the processor may perform the operations of block 508 (i.e., initiate CFRA) as described with reference to FIG. 5.

In response to determining that the downlink beam or QCL assumption for a DL RS that is mapped to the selected RACH occasion is different from any active downlink beam or QCL assumption and an uplink beam or spatial relation for a PRACH is different from any active uplink beam or spatial relation (i.e., determination block 902="Yes"), the processor may perform the operations of block 510 (i.e., initiate CBRA) as described with reference to FIG. 5. In some embodiments, such determination by the processor may imply that all active downlink and uplink transmit and receive (Tx/Rx) beam pairs have failed (e.g., that a block error rate (BLER) of all active downlink and uplink Tx/Rx beam pairs exceeds a BLER threshold).

Figure 10:
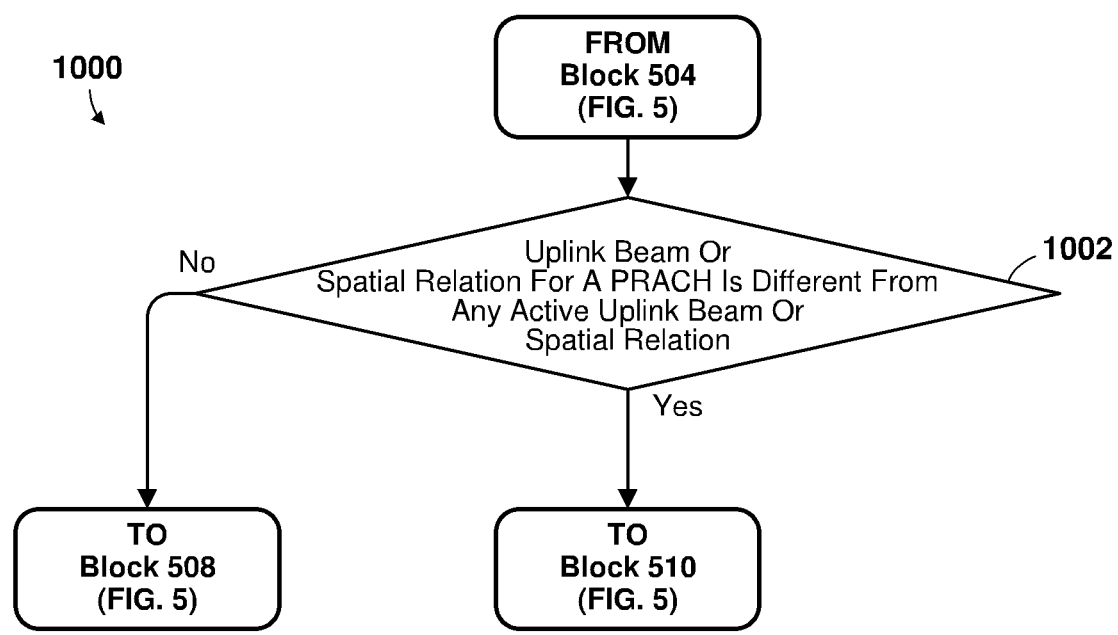

Referring to FIG. 10, after performing the operations of block 504 (FIG. 5), the processor may determine whether an uplink beam or spatial relation for a PRACH is different from any active uplink beam or spatial relation in determination block 1002. In some embodiments, the processor may perform the operations of determination block 1002 without regard to whether an active downlink beam or QCL assumption is associated with the selected RACH occasion.

In response to determining that the uplink beam or spatial relation for a PRACH is not different from any active uplink beam or spatial relation (i.e., determination block 1002="No"), the processor may perform the operations of block 508 (i.e., initiate CFRA) as described with reference to FIG. 5.

In response to determining that the uplink beam or spatial relation for a PRACH is different from any active uplink beam or spatial relation (i.e., determination block 1002="Yes"), the processor may perform the operations of block 510 (i.e., initiate CBRA) as described with reference to FIG. 5. In some embodiments, such determination by the processor may imply that all active uplink transmit and receive (Tx/Rx) beam pairs have failed (e.g., that a block error rate (BLER) of all active uplink Tx/Rx beam pairs exceeds a BLER threshold).

Figure 11:
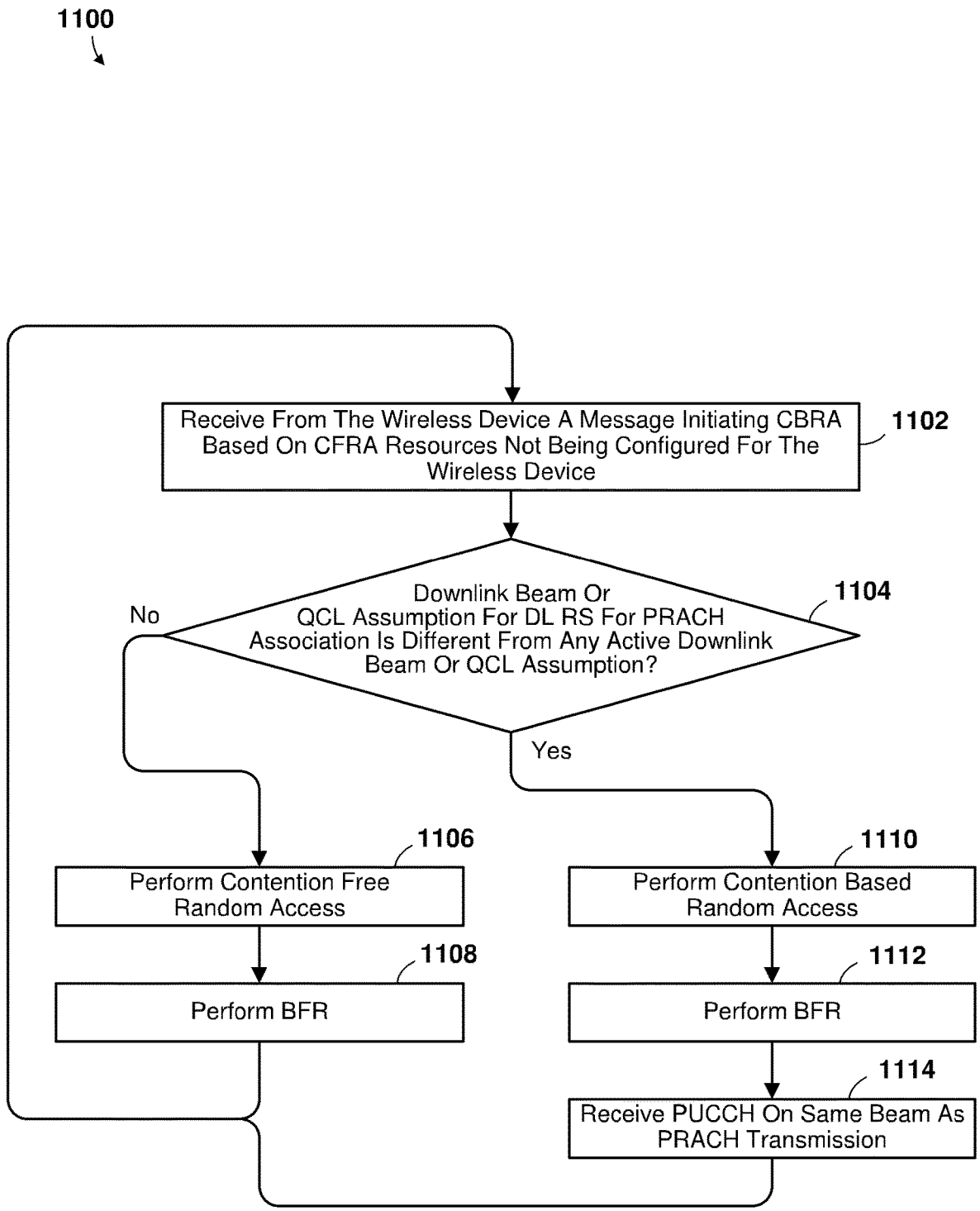
FIG. 11 is a process flow diagram illustrating a method that may be performed by a processor of a base station for managing beam failure recovery in accordance with various embodiments.

FIG. 11 is a process flow diagram illustrating a method 1100 that may be performed by a processor of a base station for managing beam failure recovery in accordance with various embodiments. With reference to FIGS. 1-11, the operations of the method 1100 may be performed by a processor (such as the processor 210, 212, 214, 216, 218, 252, 260, 432) of a base station (such as the base station 110a-120d, 200, 350, 404).

In block 1102, the processor may receive from a wireless device a message initiating contention based random access (CBRA) based on contention free random access (CFRA) resources not being configured for the wireless device. In some embodiments, the message may include a random access preamble. In some embodiments, the processor may determine a beam that will be used by the wireless device, for example, for a physical uplink control channel (PUCCH). Means for performing the operations of block 1102 may include a processor (such as the processor 210, 212, 214, 216, 218, 252, 260, 432) coupled to a wireless transceiver (e.g., 266).

In determination block 1104, the processor may determine whether a downlink beam or QCL assumption a downlink resource of a PRACH is different from any active downlink beam or QCL assumption. Means for performing the operations of determination block 1104 may include a processor (such as the processor 210, 212, 214, 216, 218, 252, 260, 432) coupled to a wireless transceiver (e.g., 266).

In response to determining that the downlink beam or QCL assumption a downlink resource of a PRACH is not different from any active downlink beam or QCL assumption (i.e., determination block 1104="No"), the processor may perform CFRA (e.g., with the wireless device) in block 1106. Means for performing the operations of determination block 1106 may include a processor (such as the processor 210, 212, 214, 216, 218, 252, 260, 432) coupled to a wireless transceiver (e.g., 266).

In block 1108, the processor may perform one or more beam failure recovery operations. Means for performing the operations of determination block 1108 may include a processor (such as the processor 210, 212, 214, 216, 218, 252, 260, 432) coupled to a wireless transceiver (e.g., 266).

In response to determining that the downlink beam or QCL assumption a downlink resource of a PRACH is different from any active downlink beam or QCL assumption (i.e., determination block 1104="Yes"), the processor may perform CBRA (e.g., with the wireless device) in block 1110. Means for performing the operations of determination block 1110 may include a processor (such as the processor 210, 212, 214, 216, 218, 252, 260, 432) coupled to a wireless transceiver (e.g., 266).

In block 1112, the processor may perform one or more beam failure recovery operations. Means for performing the operations of determination block 1112 may include a processor (such as the processor 210, 212, 214, 216, 218, 252, 260, 432) coupled to a wireless transceiver (e.g., 266).

In block 1114, the processor may receive a PUCCH message on a same beam as a PRACH transmission. For example, the processor may receive a PUCCH message from the wireless device on a same beam on which the processor received the message initiating CBRA (e.g., block 1102). In some embodiments, the processor may switch a receive beam (an Rx beam). In some embodiments, the processor may set a PUCCH beam to a PRACH beam. In some embodiments, the processor may determine based on one or more PRACH characteristics and on one or more other conditions to reset the PUCCH beam to a PRACH beam. In some embodiments, the processor may receive the PUCCH on the same beam as the PRACH transmission after a successful completion of CBRA beam failure recovery (e.g., block 1112). In some embodiments, the processor may reset the PUCCH beam to a PRACH beam (e.g., for a PCell or a PSCell) after 28 symbols from a last symbol of a first PDCCH reception where the wireless device may detect a DCI format with CRC scrambled by C-RNTI and/or until the processor sends to the wireless device an activation command for PUCCH-SpatialRelationInfo or is provided PUCCH-SpatialRelationInfo for one or more PUCCH resources. Under such conditions, the processor may expect the wireless device to transmit a PUCCH on a same cell as the PRACH transmission, for example, using one or more of a same spatial filter as for the last PRACH transmission and a determined power. Means for performing the operations of block 1102 may include a processor (such as the processor 210, 212, 214, 216, 218, 252, 260, 432) coupled to a wireless transceiver (e.g., 266).

Following the operations of blocks 1108 or 1114, the processor may again perform the operations of block 1102.

Figure 12A:
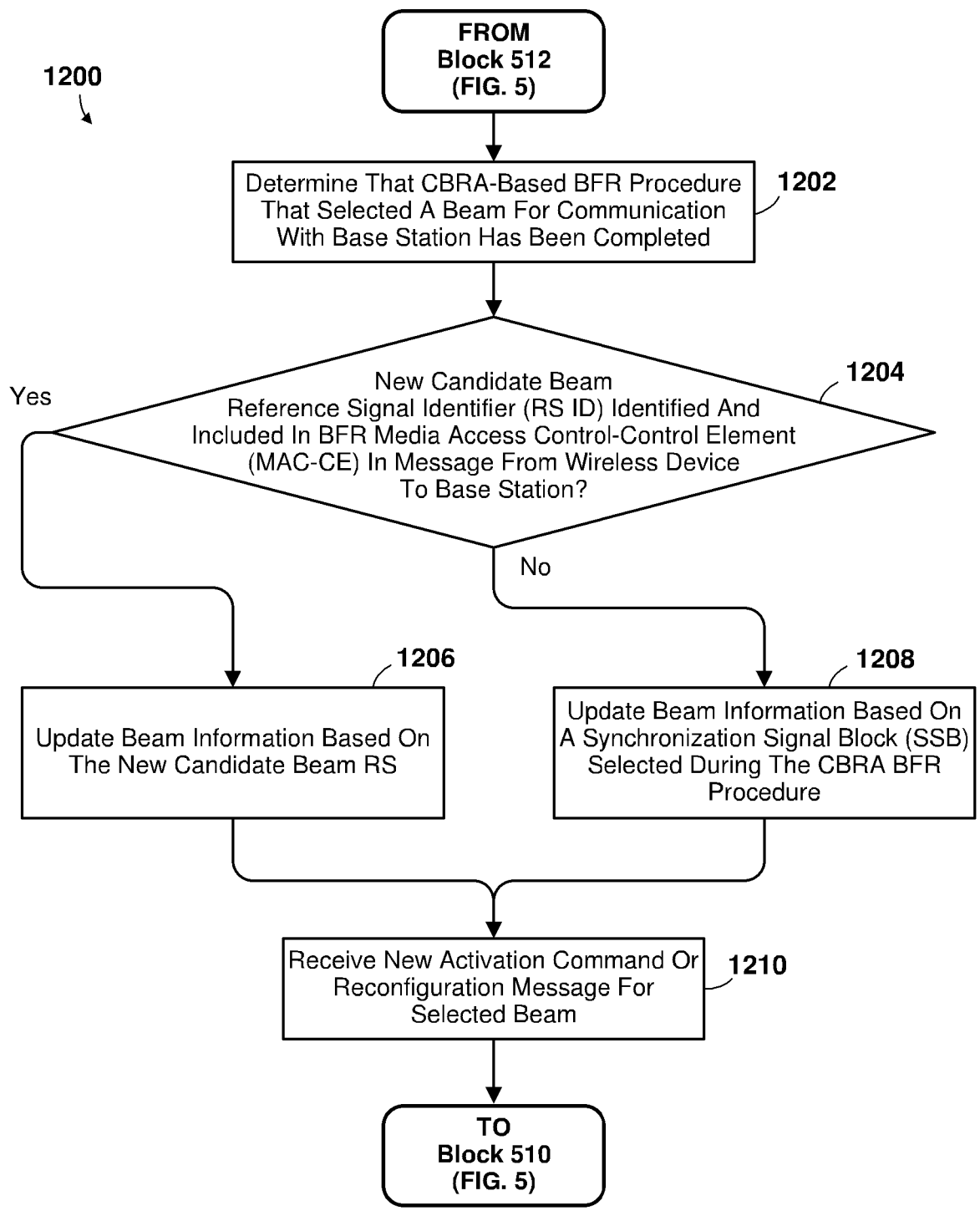
FIG. 12A is a process flow diagram illustrating a method that may be performed by a processor of a wireless device for managing beam failure recovery in accordance with various embodiments.
Figure 12B:
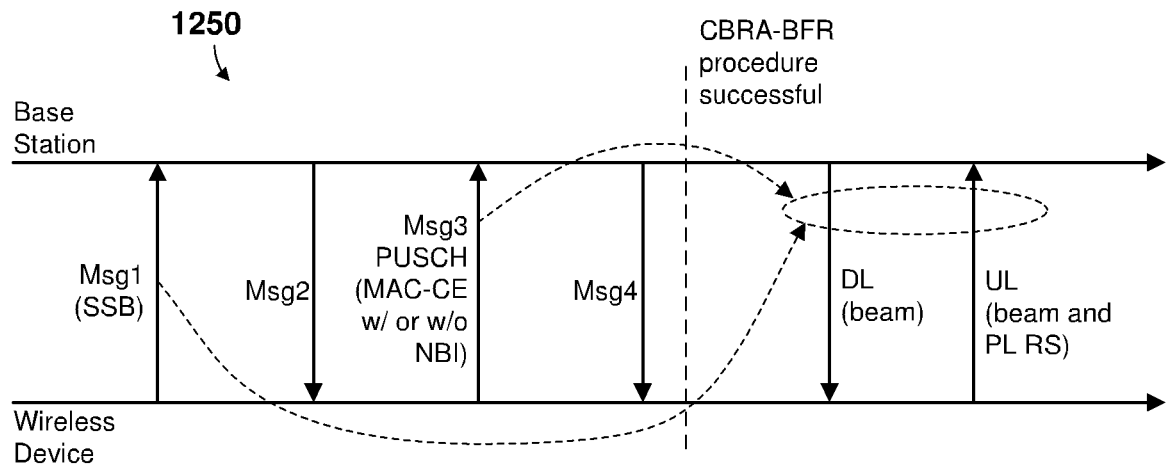
FIG. 12B is a timeline diagram illustrating a four-step contention based random access (CBRA) procedure.
Figure 12C:
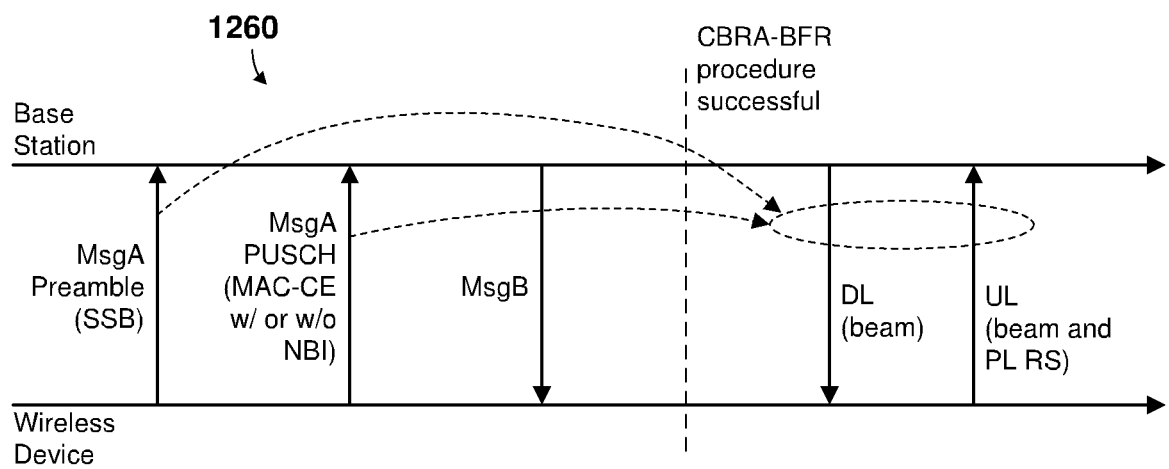
FIG. 12C is a timeline diagram illustrating a two-step CBRA procedure.
Figure 12D:
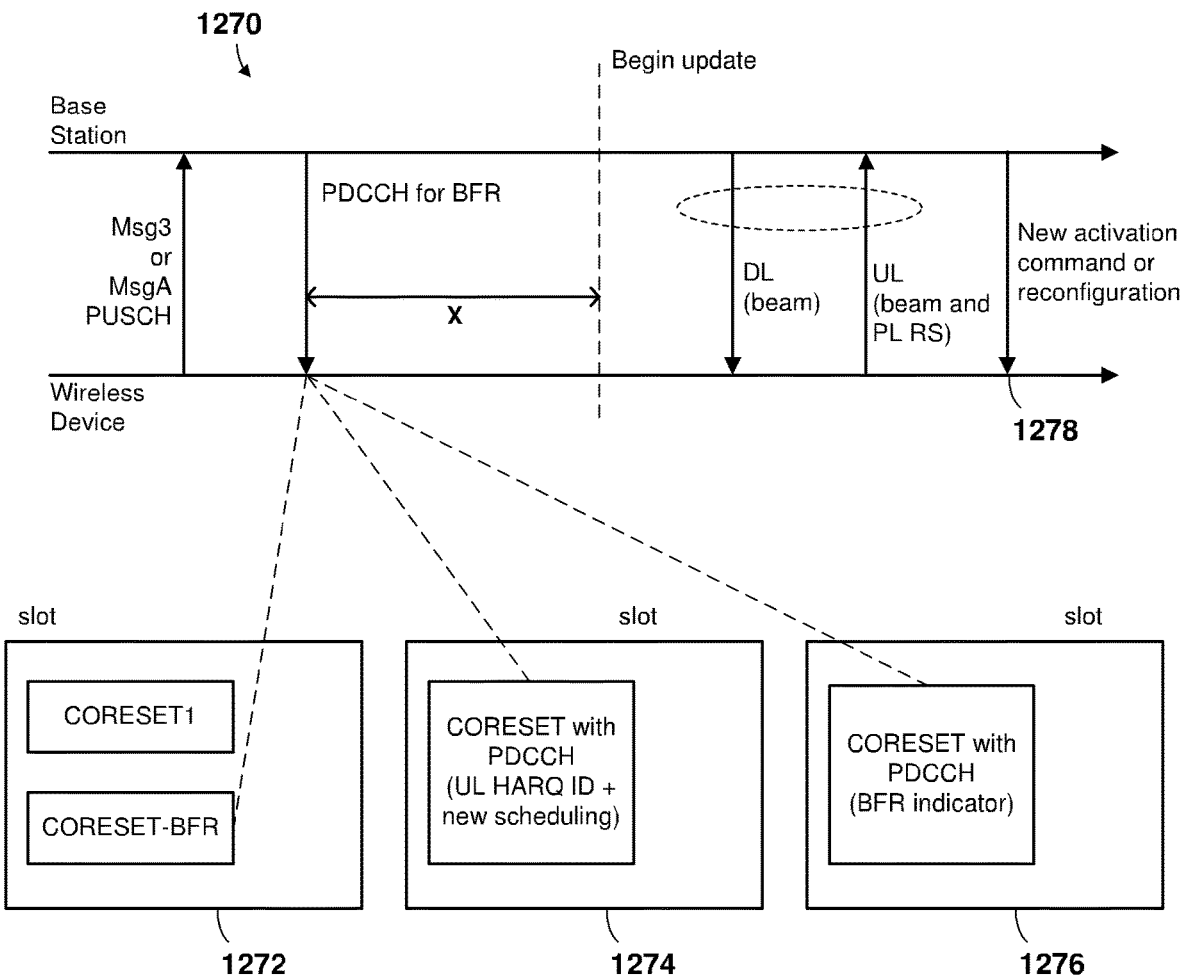
FIG. 12D is a timeline diagram illustrating embodiments of updating beam information.

FIG. 12A is a process flow diagram illustrating a method 1200 that may be performed by a processor of a wireless device for managing beam failure recovery in accordance with various embodiments. FIG. 12B is a timeline diagram illustrating a four-step CBRA procedure. FIG. 12C is a timeline diagram illustrating a two-step CBRA procedure. FIG. 12D is a timeline diagram 1270 illustrating embodiments of updating information. With reference to FIGS. 1-12D, the operations of the method 1200 may be performed by a processor (such as the processor 210, 212, 214, 216, 218, 252, 260, 428) of a wireless device (such as the wireless device 120a-120e, 200, 320, 402).

Following the operations of block 512 (FIG. 5), the processor may determine that a CBRA-based BFR procedure that selected a beam for communication with a base station has been completed in block 1202.

In determination block 1204, the processor may determine whether a new candidate beam reference signal identifier (RS ID) was identified and included in a BFR media access control-control element (MAC-CE) in a message from the wireless device to the base station. In some embodiments, the new candidate beam RS ID may be included in a Msg 3 of a four-step CBRA procedure. For example, referring to FIG. 12B, in a four-step CBRA procedure 1250, a Msg 3 may include a BFR MAC-CE. In some embodiments, the BFR MAC-CE may, or may not, include new candidate beam information (NBI). As another example, referring to FIG. 12C, in a two-step CBRA procedure 1260, a Msg A PUSCH may include a BFR MAC-CE. In some embodiments, the BFR MAC-CE in the Msg A PUSCH may, or may not, include new candidate beam information (NBI).

Returning to FIG. 12A, in response to determining that the new candidate beam RS ID is identified and included in the BFR MAC-CE in the message from the wireless device to the base station (i.e., determination block 1204="Yes"), the processor may update beam information based on the new candidate beam RS ID in block 1206.

In response to determining that the new candidate beam RS ID is not identified and included in the BFR MAC-CE in the message from the wireless device to the base station (i.e., determination block 1204="No"), the processor may update the beam information based on an SSB selected during the CBRA-based BFR procedure in block 1208. In some embodiments, the SSB beam may be the receive beam on which the wireless device receives messages from the base station in the CBRA procedure, and the transmit beam on which the wireless device transmits messages to the base station in the CBRA procedure (e.g., Msg 1 and/or Msg 3 of a four-step CBRA procedure, or Msg A of a two-step CBRA procedure). For example, the receive beam on which the wireless device receives messages from the base station in the CBRA procedure may include Msg 2 and/or Msg 4 of the four-step CBRA procedure 1250 (FIG. 12B), or Msg B of the two-step CBRA procedure 1260 (FIG. 12C). As another example, the transmit beam on which the wireless device transmits messages to the base station in the CBRA procedure may include Msg 1 and/or Msg 3 of the four-step CBRA procedure 1250, or Msg A of the two-step CBRA procedure 1260.

In various embodiments, updating the beam information may include updating beam-specific information (such a QCL assumption or TCI state) for a downlink signal, and updating the beam information may include updating beam-specific information (such a spatial filter, spatial relationship, or TCI state) and/or updating a path loss reference signal (PL RS) for an uplink signal. As noted above, in some embodiments, the processor may update the beam information based on the SSB selected during the CBRA procedure, or based on the new candidate beam RS ID if carried in BFR MAC-CE in, e.g., the Msg 3 or Msg A payload. In some embodiments, updating the beam information may include updating beam information for a downlink signal and/or regarding an uplink signal. In some embodiments, updating the beam information may include updating for a downlink signal, such as one or more control resource sets (CORESETs) and a physical downlink shared channel (PDSCH). In some embodiments, updating the beam information may include updating for an uplink signal, such as a physical uplink control channel (PUCCH), a physical uplink shared channel (PUSCH), and a sounding reference signal (SRS) with usage for codebook and non-codebook.

In some embodiments, the processor may update the beam information and PL RS based on the new candidate beam RS ID if the new candidate beam RS ID is identified and the BFR MAC-CE is carried in Msg3/A during the CBRA procedure. If the new candidate beam RS ID is not identified and/or the BFR MAC-CE is not carried in Msg3/A, the processor may update the beam information and the PL RS based on the SSB selected in during the CBRA procedure, where the SSB beam is the receive beam for receiving Msg2/4/B in the downlink, and the transmit beam for transmitting Msg1/3/A in the uplink.

In some embodiments, updating the beam information may include updating a downlink path loss reference signal (DL PL RS) for an uplink signal. In some embodiments, updating the beam information may include resetting one or more power control parameters to a default value for transmitting an uplink signal. In some embodiments, the power control parameters for transmitting the uplink signal may include one or more of PO (transmit power target), alpha (pathloss compensation factor), a close loop index, and/or a power control adjustment state index.

Following the performance of the operations of block 1206 or block 1208, the processor may receive a new activation command or a reconfiguration message for a selected beam in block 1210. Thus, the processor may update the beam information for downlink or uplink signals after the successful completion of CBRA-based BFR and prior to receiving a new activation command or reconfiguration message (e.g., RRC reconfiguration message) for the selected beam.

In various embodiments, the processor may determine that the CBRA-based BFR procedure has been successfully completed based on the reception of a message, such as a PDCCH message. Referring to FIG. 12D, in some embodiments, the processor may receive a PDCCH message 1272 sent on a special CORESET or in a special search space that is specific for a BFR response. In some embodiments, the processor may receive a PDCCH message 1274 that schedules a new uplink grant with a same hybrid automatic retransmission request (HARQ) ID as used for transmitting, for example, Msg 3 PUSCH in the four-step CBRA procedure 1250 (FIG. 12B), or Msg A PUSCH in the two-step CBRA procedure 1260 (FIG. 12C) which have carried the BFR MAC-CE. In some embodiments, the processor may receive a PDCCH message 1276 that carries an indicator that informs the wireless device that the CBRA-based BFR has been completed successfully. In various embodiments, the processor may update the beam information after the successful completion of CBRA-based BFR and prior to receiving a new activation command or reconfiguration message 1278.

In some embodiments, the processor may determine a timing for updating the beam information. In some embodiments, the processor may update the beam information and the PL RS after a number of symbols (e.g., X number of symbols, e.g., 28 symbols) following the reception of the PDCCH message (e.g., 1272, 1274, 1276). In some embodiments, the symbol sub-carrier spacing (SCS) may be the smaller of a PDCCH SCS and a scheduled transmission (Tx) SCS. In some embodiments, the processor may update the beam information and the PL RS for current active downlink and uplink bandwidth parts (BWP). In some embodiments, the processor may update the beam information and the PL RS for all BWPs configured for the transmission (Tx) of uplink signals and the reception (Rx) of downlink signals.

The processor may proceed to perform the operations of block 510 of the method 500 (FIG. 5) as described.

Figure 13:
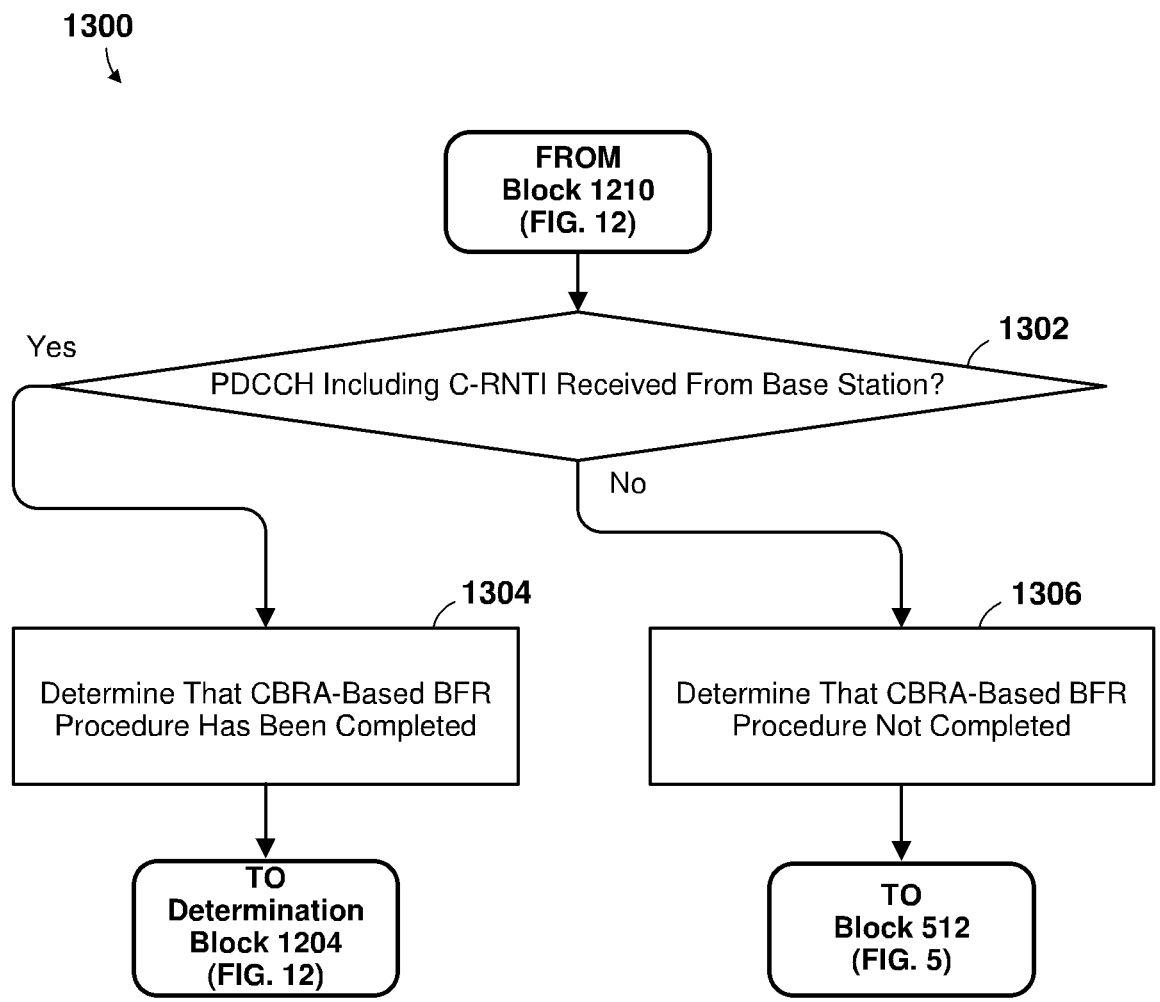
FIG. 13 are process flow diagrams illustrating operations that may be performed by a processor of a wireless device as part of a method for managing beam failure recovery in accordance with various embodiments.

FIG. 13 is a process flow diagram illustrating operations 1300 that may be performed by a processor of a wireless device as part of the method 1200 for managing beam failure recovery in accordance with various embodiments. With reference to FIGS. 1-13, the operations 1300 may be performed by a processor of a wireless device (such as the wireless device 120a-120e, 200, 320, 402).

Referring to FIG. 13, after performing the operations of block 1210 (FIG. 12), the processor may determine whether a PDCCH including a cell-radio network temporary identifier (C-RNTI) is received from the base station in determination block 1302.

In response to determining that the PDCCH including the C-RNTI is received from the base station (i.e., determination block 1302="Yes"), the processor may determine that the CBRA-based BFR procedure has been completed in block 1304.

The processor may proceed to perform the operations of determination block 1204 (FIG. 12).

In response to determining that the PDCCH including the C-RNTI is not received from the base station (i.e., determination block 1302="No"), the processor may determine that the CBRA-based BFR procedure has not been completed in block 1306.

The processor may then proceed to perform (or continue) the operations of block 512 (FIG. 5).

Figure 14A:
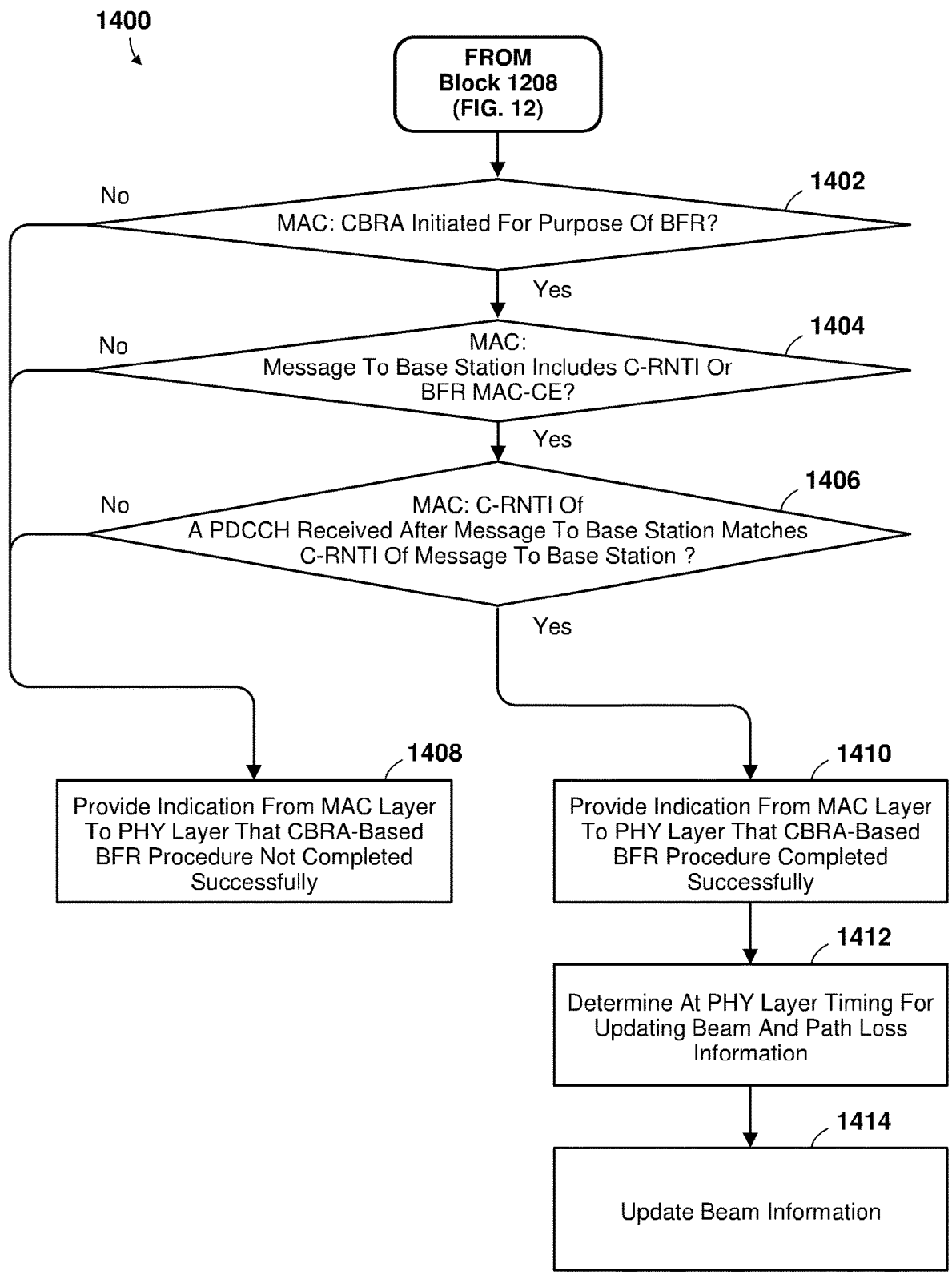
FIG. 14A is a process flow diagram illustrating operations that may be performed by a processor of a wireless device as part of a method for managing beam failure recovery in accordance with various embodiments.
Figure 14B:
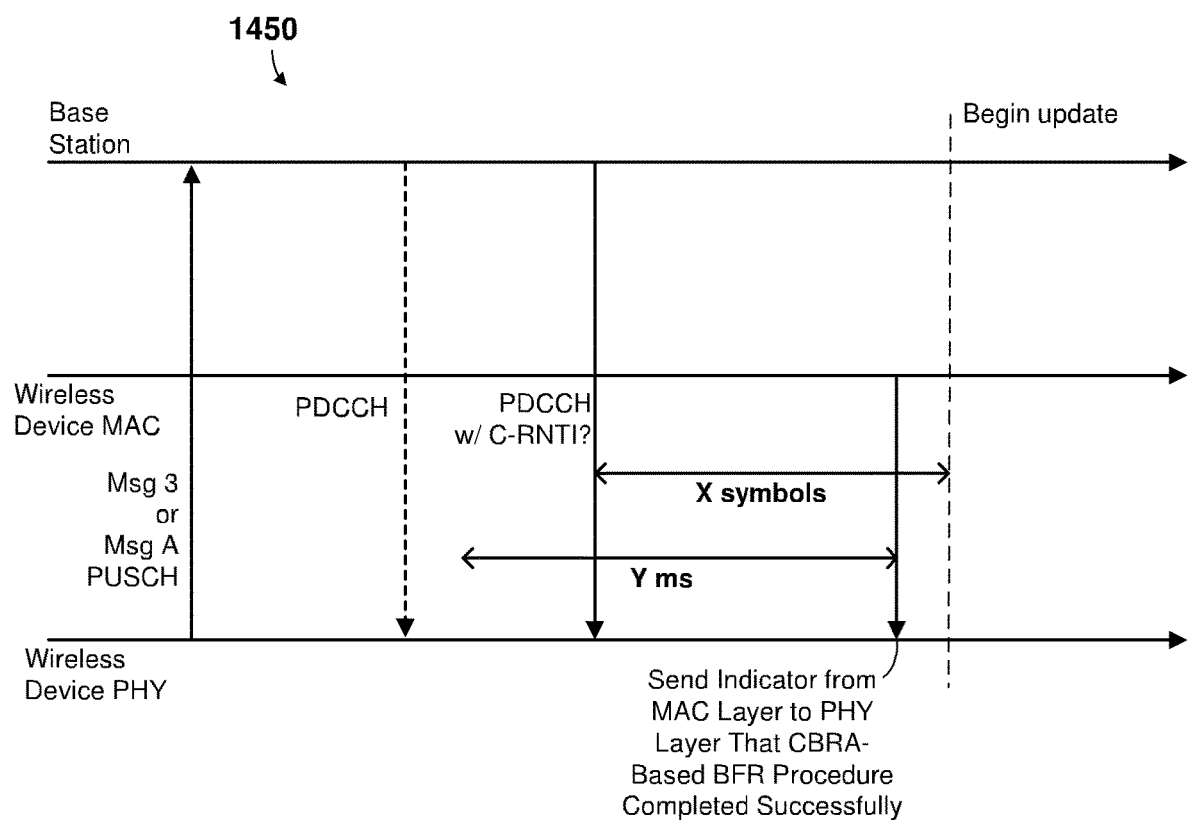
FIG. 14B is a timeline diagram of a timing of updating beam information.

FIG. 14A is a process flow diagram illustrating operations 1400 that may be performed by a processor of a wireless device as part of a method 1200 for managing beam failure recovery in accordance with various embodiments. FIG. 14B is a timeline diagram of a timing 1450 of updating beam information. With reference to FIGS. 1-14B, the operations 1400 may be performed by a processor (such as the processor 210, 212, 214, 216, 218, 252, 260, 428) of a wireless device (such as the wireless device 120a-120e, 200, 320, 402). The description below refers to a MAC layer and a PHY layer of the wireless device, the operations of both of which are implemented by the processor of the wireless device.

Following the operations of block 1208 (FIG. 12A), the MAC layer may determine whether the CBRA was initiated for the purpose of performing BFR in determination block 1402. In various embodiments, a wireless device may initiate a random access procedure for a variety of purposes, including initial network access, base station handover, and out-of-time synchronization in uplink or downlink data transmission, as well as for the purposes of BFR.

In response to determining that the CBRA was initiated for the purpose of performing BFR (i.e., determination block 1402="Yes"), the MAC layer may determine whether a message sent from the wireless device to the base station as part of the CBRA process (e.g., Msg 3 or Msg A) includes a C-RNTI MAC-CE or a BFR MAC-CE in determination block 1404.

In response to determining that the message sent from the wireless device to the base station as part of the CBRA process (e.g., Msg 3 or Msg A) includes a C-RNTI MAC-CE and/or a BFR MAC-CE (i.e., determination block 1404="Yes"), the MAC layer may determine whether a C-RNTI of a PDCCH received after the message to the base station matches the C-RNTI MAC-CE of the message to the base station in determination block 1406.

In response to determining that the CBRA was not initiated for the purpose of performing BFR (i.e., determination block 1402="No"), or that the message sent from the wireless device to the base station as part of the CBRA process (e.g., Msg 3 or Msg A) does not either C-RNTI MAC-CE or a BFR MAC-CE (i.e., determination block 1404="No"), or that the C-RNTI of a PDCCH received after the message to the base station does not match the C-RNTI MAC-CE of the message to the base station (i.e., determination block 1406="No"), the MAC layer may provide an indication to the PHY layer that the CBRA-based BFR was not completed successfully in block 1408.

In response to determining that the C-RNTI of a PDCCH received after the message to the base station matches the C-RNTI MAC-CE of the message to the base station (i.e., determination block 1406="Yes"), the MAC layer may provide an indication to the PHY layer that the CBRA-based BFR was completed successfully in block 1410.

In block 1412, the PHY layer may determine a timing for updating the beam information. Referring to FIG. 14B, in some embodiments, the PHY layer may determine the timing 1450 for updating the beam information based on X number of symbols after the reception of the latest PDCCH with C-RNTI before the MAC layer sends to the PHY layer the indication that the CBRA-based BFR procedure was completed successfully. In some embodiments the PHY layer may determine whether the PDCCH with C-RNTI is received within a window of Y milliseconds (ms) before the MAC layer provides the indication to the PHY layer that the CBRA-based BFR was completed successfully. In response to determining that the PDCCH with C-RNTI is received within a window of Y milliseconds (ms) before the MAC layer provides the indicator to the PHY layer that the CBRA-based BFR was completed successfully, the PHY layer may begin to update the beam information. In some embodiments, the value of Y ms may be a predetermined value. In some embodiments, the value of Y ms may be indicated by the MAC layer to the PHY layer.

Figure 15A:
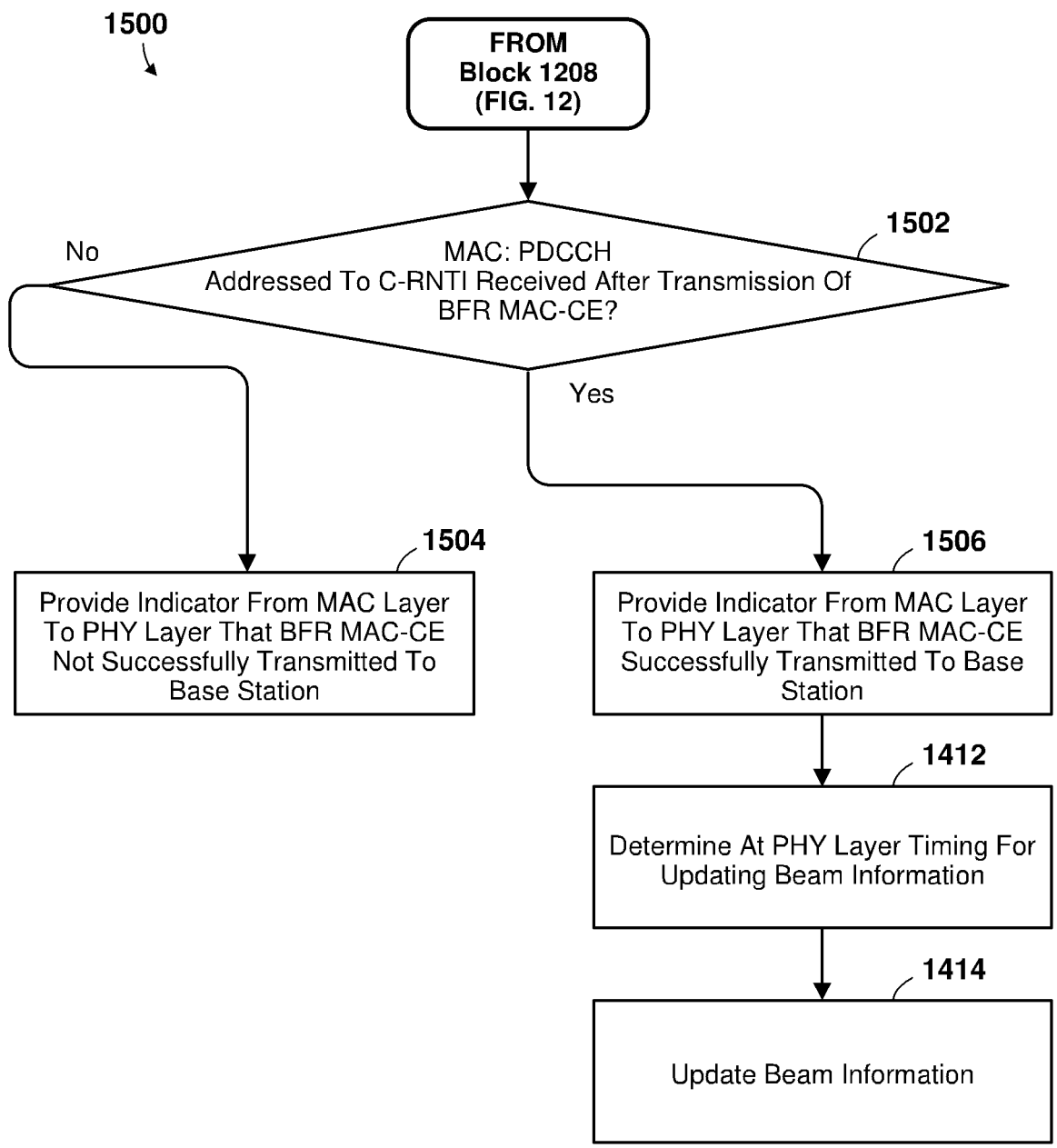
FIG. 15A is a process flow diagram illustrating operations that may be performed by a processor of a wireless device as part of a method for managing beam failure recovery in accordance with various embodiments.
Figure 15B:
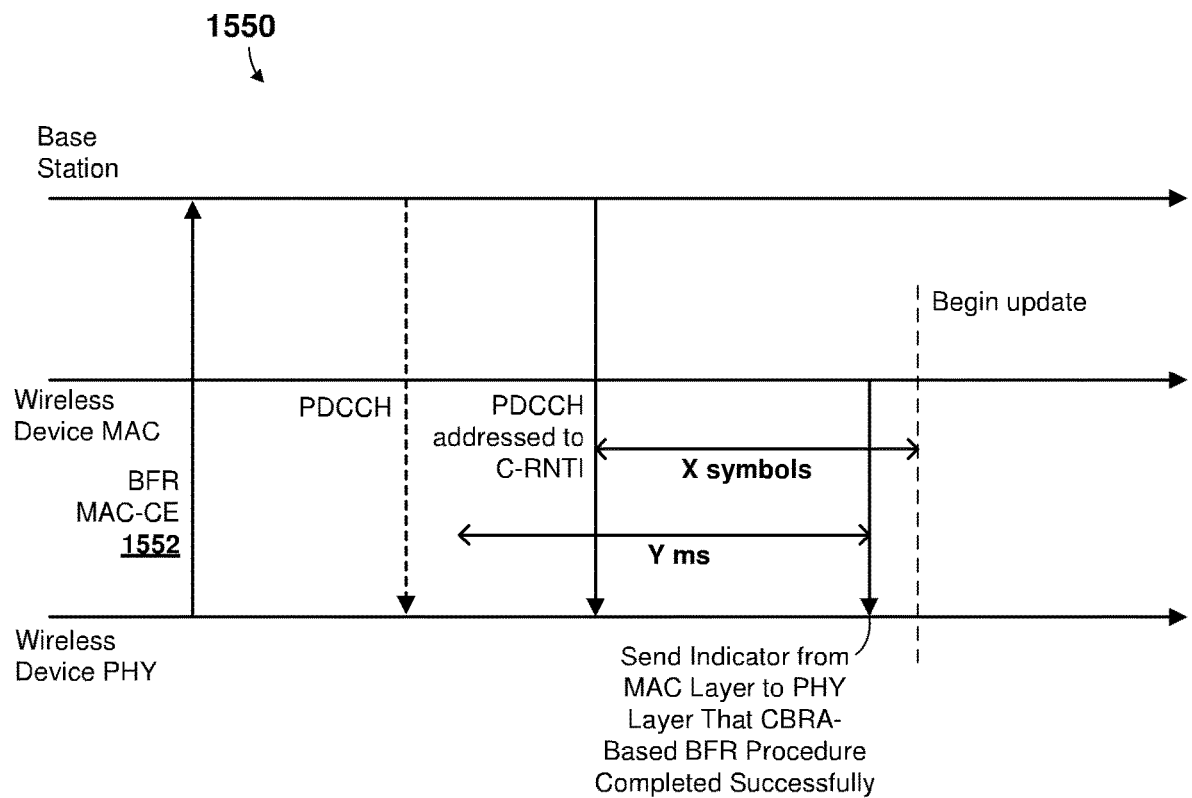
FIG. 15B is a timeline diagram of a timing of updating beam information.

FIG. 15A is a process flow diagram illustrating operations 1500 that may be performed by a processor of a wireless device as part of a method 1200 for managing beam failure recovery in accordance with various embodiments. FIG. 15B is a timeline diagram of a timing 1550 of updating beam information. With reference to FIGS. 1-15B, the operations 1400 may be performed by a processor (such as the processor 210, 212, 214, 216, 218, 252, 260, 428) of a wireless device (such as the wireless device 120a-120e, 200, 320, 402). The description below refers to a MAC layer and a PHY layer of the wireless device, the operations of both of which are implemented by the processor of the wireless device.

In determination block 1502, the MAC layer may determine whether a PDCCH addressed to the C-RNTI is received after the transmission of a BFR MAC-CE. In various embodiments, the BFR MAC-CE (e.g., 1552) may be transmitted in any PUSCH, including a new uplink grant solicited by the wireless device's beam failure recovery request send in a PUCCH BFR, a semi-statically configured uplink grant, or an uplink grant for the transmission of a message to the base station (e.g., Msg 3 or Msg A during the CBRA procedure).

In response to determining that the PDCCH addressed to the C-RNTI is not received after the transmission of a BFR MAC-CE (i.e., determination block 1502="No"), the MAC layer may provide an indicator to the PHY layer that the BFR MAC-CE was not successfully transmitted to the base station in block 1504.

In response to determining that the PDCCH addressed to the C-RNTI is received after the transmission of a BFR MAC-CE (i.e., determination block 1502="Yes"), the MAC layer may provide an indicator to the PHY layer that the BFR MAC-CE was successfully transmitted to the base station in block 1506. In some embodiments, the MAC layer may receive the PDCCH addressed to the C-RNTI on a special CORESET or in a special search space that is specific for a BFR response (e.g., PDCCH message 1272, FIG. 12D). In some embodiments, the MAC layer may receive the PDCCH addressed to the C-RNTI in a PDCCH message (e.g., 1274, FIG. 12D) that schedules a new uplink grant with a same hybrid automatic retransmission request (HARQ) ID as used for transmitting, for example, Msg 3 in the four-step CBRA procedure 1250 (FIG. 12B), or Msg A in the two-step CBRA procedure 1260 (FIG. 12C). In some embodiments, the MAC layer may receive the PDCCH addressed to the C-RNTI in a PDCCH message (e.g., 1276, FIG. 12D) that carries an indicator that informs the wireless device that the transmission of BFR MAC-CE is successful.

In some embodiments, providing the indicator of successful transmission of BFR MAC-CE from the MAC layer to the PHY layer may trigger the PHY layer to update the beam information. In some embodiments, the PHY layer may perform the operations of blocks 1412 and 1414 as described (FIG. 14A) to determine the timing for updating the beam and PL RS information with reference to the PDCCH addressed to the C-RNTI in place of the PDCCH with the C-RNTI.

Figure 16:
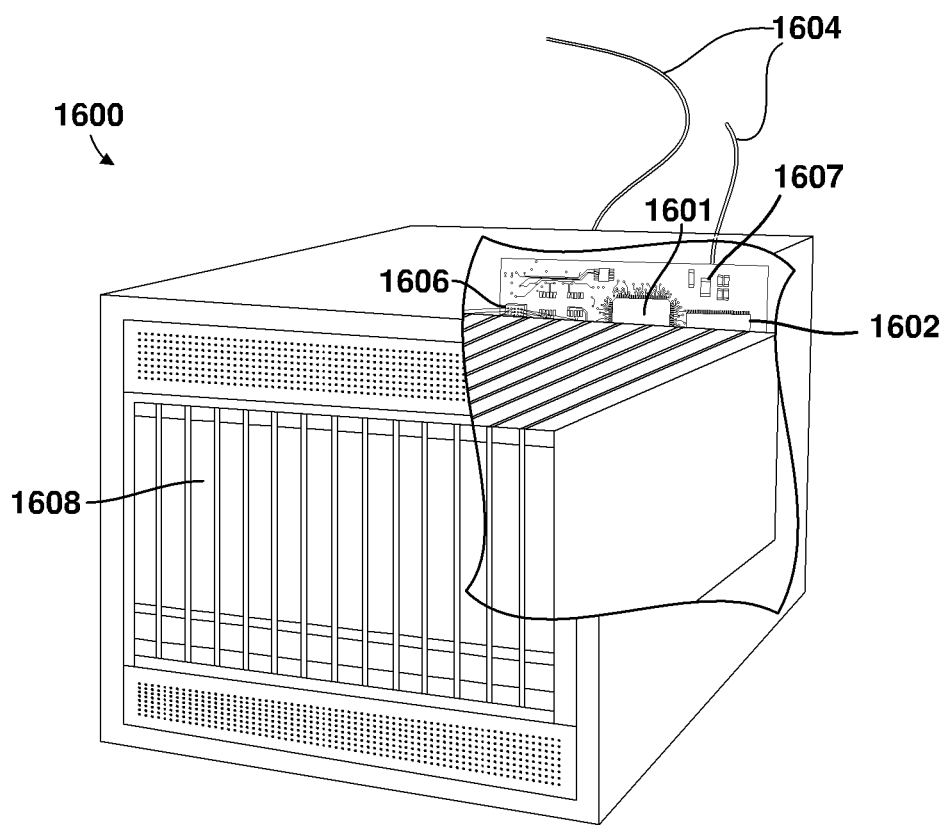
FIG. 16 is a component block diagram of a network computing device suitable for use with various embodiments.

FIG. 16 is a component block diagram of a network computing device suitable for use with various embodiments. Such network computing devices (e.g., base station 110a-110d, 404) may include at least the components illustrated in FIG. 16. With reference to FIGS. 1-16, the network computing device 1600 may typically include a processor 1601 coupled to volatile memory 1602 and a large capacity nonvolatile memory, such as a disk drive 1608. The network computing device 1600 also may include a peripheral memory access device 1606 such as a floppy disc drive, compact disc (CD) or digital video disc (DVD) drive coupled to the processor 1601. The network computing device 1600 also may include network access ports 1604 (or interfaces) coupled to the processor 432 for establishing data connections with a network, such as the Internet or a local area network coupled to other system computers and servers. The network computing device 1600 may include one or more antennas 1607 for sending and receiving electromagnetic radiation that may be connected to a wireless communication link. The network computing device 1600 may include additional access ports, such as USB, Firewire, Thunderbolt, and the like for coupling to peripherals, external memory, or other devices.

Figure 17:
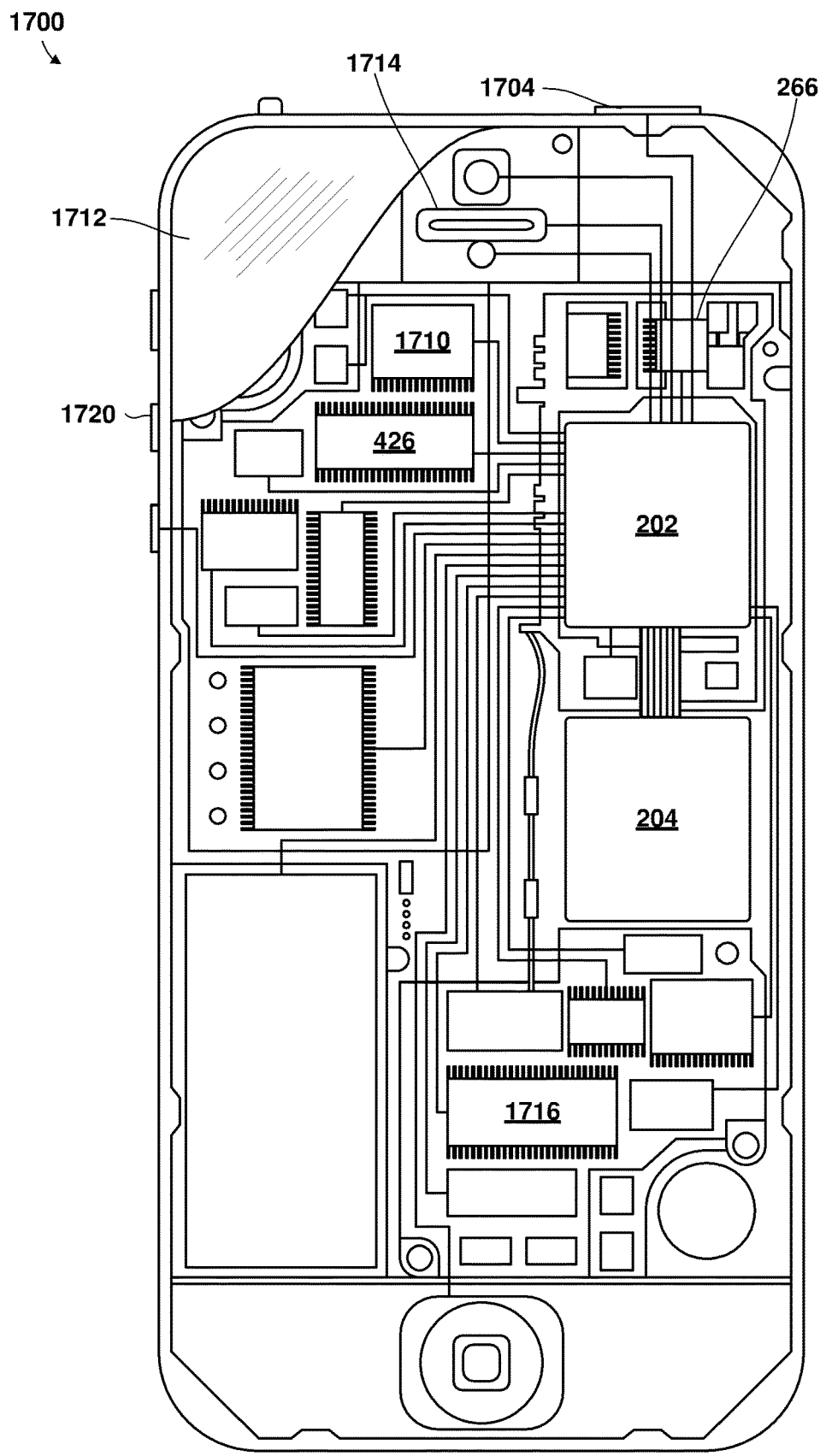
FIG. 17 is a component block diagram of a wireless communication device suitable for use with various embodiments.

FIG. 17 is a component block diagram of a wireless device 1700 suitable for use with various embodiments. With reference to FIGS. 1-17, various embodiments may be implemented on a variety of wireless devices 1700 (for example, the wireless device 120a-120e, 200, 320, 402), an example of which is illustrated in FIG. 17 in the form of a smartphone. The wireless device 1700 may include a first SOC 202 (for example, a SOC-CPU) coupled to a second SOC 204 (for example, a 5G capable SOC). The first and second SOCs 202, 204 may be coupled to internal memory 426, 1716 (e.g., 426), a display 1712, and to a speaker 1714. Additionally, the wireless device 1700 may include an antenna 1704 for sending and receiving electromagnetic radiation that may be connected to a wireless transceiver 266 coupled to one or more processors in the first or second SOCs 202, 204. Smartphones 1700 typically also include menu selection buttons or rocker switches 1720 for receiving user inputs.

A wireless device 1700 may also include a sound encoding/decoding (CODEC) circuit 1710, which digitizes sound received from a microphone into data packets suitable for wireless transmission and decodes received sound data packets to generate analog signals that are provided to the speaker to generate sound. One or more of the processors in the first and second SOCs 202, 204, wireless transceiver 266 and CODEC 1710 may include a digital signal processor (DSP) circuit (not shown separately).

The processors of the network computing device 1600 and the wireless device 1700 may be any programmable microprocessor, microcomputer or multiple processor chip or chips that can be configured by software instructions (applications) to perform a variety of functions, including the functions of some implementations described below. In some wireless devices, multiple processors may be provided, such as one processor within an SOC 204 dedicated to wireless communication functions and one processor within an SOC 202 dedicated to running other applications. Software applications may be stored in the memory 1606, 426 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 500-1500 may be substituted for or combined with one or more operations of the methods 500-1500.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a wireless device for managing beam failure recovery (BFR), comprising:
    selecting a synchronization signal block (SSB) in a contention based random access (CBRA)-based beam failure recovery (BFR) procedure;
    determining that the CBRA-based BFR procedure has been completed; and
    updating beam information based on the SSB selected during the CBRA-based BFR procedure, wherein a new candidate beam reference signal identifier (RS ID) was not identified and included in a BFR medium access control-control element (MAC-CE) in a message from the wireless device to a base station.

2. The method of claim 1, wherein updating the beam information comprises updating one or more control resource sets (CORESETs) and a physical downlink shared channel (PDSCH) for a downlink signal.

3. The method of claim 1, wherein updating the beam information comprises updating a physical uplink control channel (PUCCH), a physical uplink shared channel (PUSCH), and a sounding reference signal (SRS) for an uplink signal.

4. The method of claim 1, wherein updating the beam information comprises updating a downlink path loss reference signal (DL PL RS).

5. The method of claim 1, wherein updating the beam information comprises resetting one or more power control parameters to a default value.

6. The method of claim 1, wherein determining that the CBRA-based BFR procedure has been completed comprises:
receiving a physical downlink control channel (PDCCH) including a cell-radio network temporary identifier (C-RNTI) from the base station; and
determining that the CBRA-based BFR procedure has been completed in response to receiving the PDCCH including the C-RNTI from the base station.

7. The method of claim 1, wherein determining that the CBRA-based BFR procedure has been completed comprises receiving a physical downlink control channel (PDCCH) message sent on a special control resource set (CORESET) or in a search space that is specific for a BFR response.

8. The method of claim 1, wherein updating the beam information comprises:
determining a timing for updating the beam information; and
updating the beam information according to the determined timing.

9. The method of claim 8, wherein determining the timing for updating the beam information comprises determining a number of symbols after receiving a latest physical downlink control channel (PDCCH) with a cell-radio network temporary identifier (C-RNTI) before a medium access control layer (MAC layer) sends to a physical layer (PHY layer) an indication that the CBRA-based BFR procedure was completed successfully.

10. The method of claim 1, wherein determining that the CBRA-based BFR procedure that has been completed comprises:
receiving a physical downlink control channel (PDCCH) addressed to a cell-radio network temporary identifier (C-RNTI) from the base station after transmission of the BFR MAC-CE; and
determining that the CBRA-based BFR procedure that has been completed in response to receiving the PDCCH including the C-RNTI from the base station.

11. A wireless device, comprising:
one or more processors configured with processor executable instructions to perform operations comprising:
selecting a synchronization signal block (SSB) in a contention based random access (CBRA)-based beam failure recovery (BFR) procedure;
determining that the CBRA-based BFR procedure has been completed; and
updating beam information based on the SSB selected during the CBRA-based BFR procedure, wherein a new candidate beam reference signal identifier (RS ID) was not identified and included in a BFR medium access control-control element (MAC-CE) in a message from the wireless device to a base station.

12. The wireless device of claim 11, wherein the one or more processors are configured with processor executable instructions to perform operations such that updating the beam information comprises updating one or more control resource sets (CORESETs) and a physical downlink shared channel (PDSCH) for a downlink signal.

13. The wireless device of claim 11, wherein the one or more processors are configured with processor executable instructions to perform operations such that updating the beam information comprises updating a physical uplink control channel (PUCCH), a physical uplink shared channel (PUSCH), and a sounding reference signal (SRS) for an uplink signal.

14. The wireless device of claim 11, wherein the one or more processors are configured with processor executable instructions to perform operations such that updating the beam information comprises updating a downlink path loss reference signal (DL PL RS).

15. The wireless device of claim 11, wherein the one or more processors are configured with processor executable instructions to perform operations such that updating the beam information comprises resetting one or more power control parameters to a default value.

16. The wireless device of claim 11, wherein the one or more processors are configured with processor executable instructions to perform operations such that determining that the CBRA-based BFR procedure has been completed comprises:
receiving a physical downlink control channel (PDCCH) including a cell-radio network temporary identifier (C-RNTI) from the base station; and
determining that the CBRA-based BFR procedure has been completed in response to receiving the PDCCH including the C-RNTI from the base station.

17. The wireless device of claim 11, wherein the one or more processors are configured with processor executable instructions to perform operations such that determining that the CBRA-based BFR procedure has been completed comprises receiving a physical downlink control channel (PDCCH) message sent on a special control resource set (CORESET) or in a search space that is specific for a BFR response.

18. The wireless device of claim 11, wherein the one or more processors are configured with processor executable instructions to perform operations such that updating the beam information comprises:
determining a timing for updating the beam information; and
updating the beam information according to the determined timing.

19. The wireless device of claim 18, wherein the one or more processors are configured with processor executable instructions to perform operations such that determining the timing for updating the beam information comprises determining a number of symbols after receiving a latest physical downlink control channel (PDCCH) with a cell-radio network temporary identifier (C-RNTI) before a medium access control layer (MAC layer) sends to a physical layer (PHY layer) an indication that the CBRA-based BFR procedure was completed successfully.

20. The wireless device of claim 11, wherein the one or more processors are configured with processor executable instructions to perform operations such that determining that the CBRA-based BFR procedure has been completed comprises:

receiving a physical downlink control channel (PDCCH) addressed to a cell-radio network temporary identifier (C-RNTI) from the base station after transmission of the BFR MAC-CE; and determining that the CBRA-based BFR procedure that has been completed in response to receiving the PDCCH including the C-RNTI from the base station.

21. A non-transitory processor-readable medium having stored thereon processor-executable instructions configured to cause a processing device in a wireless device to perform operations comprising:

selecting a synchronization signal block (SSB) in a contention based random access (CBRA)-based beam failure recovery (BFR) procedure;

determining that the CBRA-based BFR procedure has been completed; and updating beam information based on the SSB selected during the CBRA-based BFR procedure, wherein a new candidate beam reference signal identifier (RS ID) was not identified and included in a BFR medium access control-control element (MAC-CE) in a message from the wireless device to a base station.

22. The non-transitory processor-readable medium of claim 21, wherein the stored processor-executable instructions are configured to cause the processing device to perform operations such that updating the beam information comprises updating one or more control resource sets (CORESETs) and a physical downlink shared channel (PDSCH) for a downlink signal.

23. The non-transitory processor-readable medium of claim 21, wherein the stored processor-executable instructions are configured to cause the processing device to perform operations such that updating the beam information comprises updating a physical uplink control channel (PUCCH), a physical uplink shared channel (PUSCH), and a sounding reference signal (SRS) for an uplink signal.

24. The non-transitory processor-readable medium of claim 21, wherein the stored processor-executable instructions are configured to cause the processing device to perform operations such that updating the beam information comprises updating a downlink path loss reference signal (DL PL RS).

25. The non-transitory processor-readable medium of claim 21, wherein the stored processor-executable instructions are configured to cause the processing device to perform operations such that updating the beam information comprises resetting one or more power control parameters to a default value.

26. The non-transitory processor-readable medium of claim 21, wherein the stored processor-executable instructions are configured to cause the processing device to perform operations such that determining that the CBRA-based BFR procedure has been completed comprises:

receiving a physical downlink control channel (PDCCH) including a cell-radio network temporary identifier (C-RNTI) from the base station; and determining that the CBRA-based BFR procedure has been completed in response to receiving the PDCCH including the C-RNTI from the base station.

27. The non-transitory processor-readable medium of claim 21, wherein the stored processor-executable instructions are configured to cause the processing device to perform operations such that determining that the CBRA-based BFR procedure has been completed comprises receiving a physical downlink control channel (PDCCH) message sent on a special control resource set (CORESET) or in a search space that is specific for a BFR response.

28. The non-transitory processor-readable medium of claim 21, wherein the stored processor-executable instructions are configured to cause the processing device to perform operations such that updating the beam information comprises:

determining a timing for updating the beam information; and updating the beam information according to the determined timing.

29. The non-transitory processor-readable medium of claim 28, wherein the stored processor-executable instructions are configured to cause the processing device to perform operations such that determining the timing for updating the beam information comprises determining a number of symbols after receiving a latest physical downlink control channel (PDCCH) with a cell-radio network temporary identifier (C-RNTI) before a medium access control layer (MAC layer) sends to a physical layer (PHY layer) an indication that the CBRA-based BFR procedure was completed successfully.

30. A wireless device, comprising:

means for selecting a synchronization signal block (SSB) in a contention based random access (CBRA)-based beam failure recovery (BFR) procedure;

means for determining that the CBRA-based BFR procedure has been completed; and means for updating beam information based on the SSB selected during the CBRA-based BFR procedure, wherein a new candidate beam reference signal identifier (RS ID) was not identified and included in a BFR medium access control-control element (MAC-CE) in a message from the wireless device to a base station.

\* \* \* \* \*